US008154648B2

(12) United States Patent
Morooka

(10) Patent No.: US 8,154,648 B2
(45) Date of Patent: Apr. 10, 2012

(54) ZOOM LENS SYSTEM AND IMAGE PICKUP APPARATUS USING THE SAME

(75) Inventor: Masaru Morooka, Akishima (JP)

(73) Assignee: Olympus Imaging Corp., Tokyo (JP)

( * ) Notice: Subject to any disclaimer, the term of this patent is extended or adjusted under 35 U.S.C. 154(b) by 347 days.

(21) Appl. No.: 12/653,520

(22) Filed: Dec. 14, 2009

(65) Prior Publication Data
US 2010/0157106 A1   Jun. 24, 2010

(30) Foreign Application Priority Data

Dec. 18, 2008  (JP) ................................. 2008-322235
Dec. 18, 2008  (JP) ................................. 2008-322267

(51) Int. Cl.
*H04N 5/225*   (2006.01)
*G02B 13/16*   (2006.01)
(52) U.S. Cl. ...................................................... 348/335
(58) Field of Classification Search ............. 348/240.99, 348/240.3, 335, 340, 345
See application file for complete search history.

(56) References Cited

U.S. PATENT DOCUMENTS

| 7,423,813 | B2* | 9/2008 | Kamo | 359/686 |
| 7,502,172 | B2 | 3/2009 | Kanetaka | |
| 7,830,613 | B2* | 11/2010 | Ichikawa | 359/687 |
| 2003/0103157 | A1* | 6/2003 | Watanabe et al. | 348/360 |
| 2006/0170815 | A1* | 8/2006 | Watanabe et al. | 348/357 |
| 2006/0274168 | A1* | 12/2006 | Watanabe et al. | 348/240.3 |
| 2006/0274169 | A1* | 12/2006 | Watanabe et al. | 348/240.3 |
| 2006/0285222 | A1 | 12/2006 | Kanetaka | |
| 2008/0111909 | A1* | 5/2008 | Miyajima | 348/335 |
| 2009/0073573 | A1 | 3/2009 | Kanetaka | |

FOREIGN PATENT DOCUMENTS

| JP | 2004-31808 | 11/2004 |
| JP | 2004-318107 | 11/2004 |
| JP | 2007-156385 | 6/2007 |

* cited by examiner

*Primary Examiner* — Nicholas Giles
(74) *Attorney, Agent, or Firm* — Kenyon & Kenyon LLP

(57) ABSTRACT

A zoom lens system includes in order from an object side, a first lens unit having a negative refracting power, a second lens unit having a positive refracting power, a third lens unit having a positive refracting power, and a fourth lens unit having a negative refracting power. At the time of zooming from a wide angle end to a telephoto end, the second lens unit moves such that a distance between the first lens unit and the second lens unit decreases, and distances between the other lens units change. The first lens unit includes in order from the object side, one negative lens component having an aspheric surface at least on one surface, and one positive lens component, the fourth lens unit includes one negative lens component having a surface on the object side as a concave surface, and satisfies the following conditional expression (1)

$$-4<(R_{4a}+R_{4b})/(R_{4a}-R_{4b})<-0.5 \qquad (1).$$

35 Claims, 17 Drawing Sheets

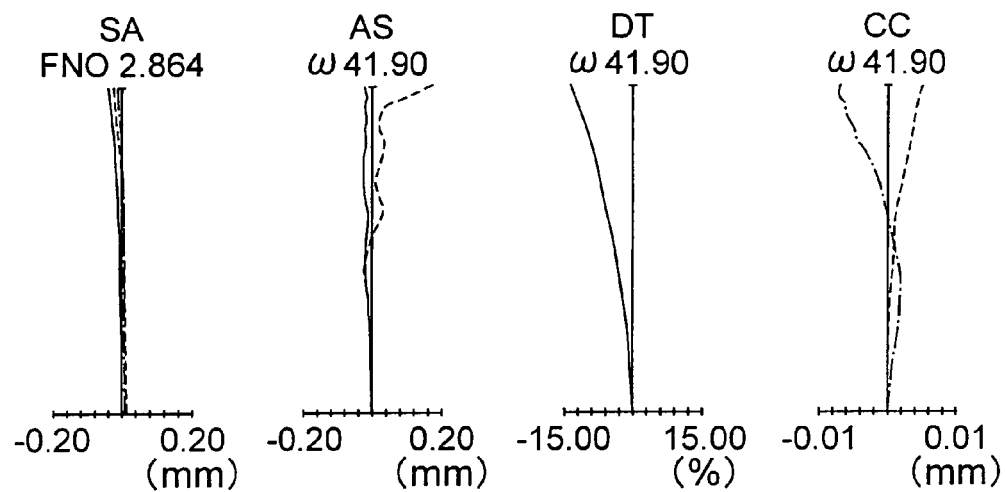
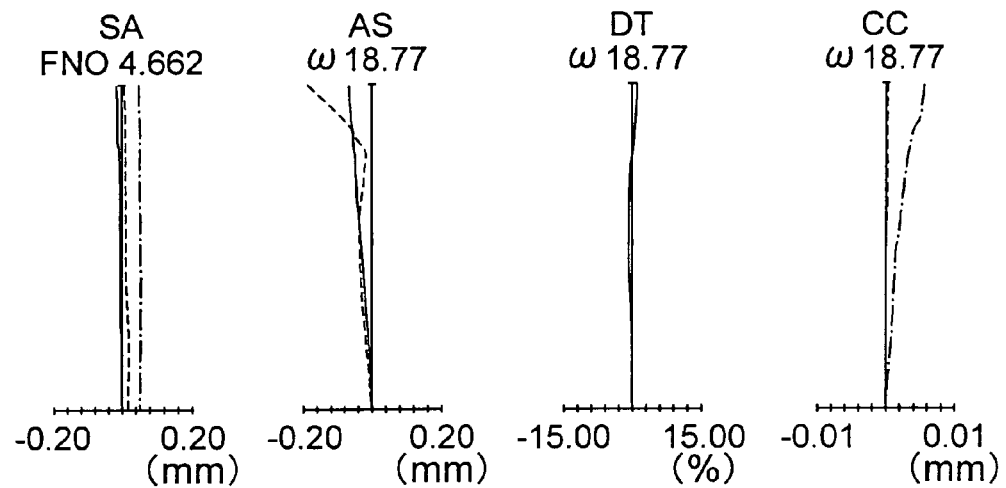
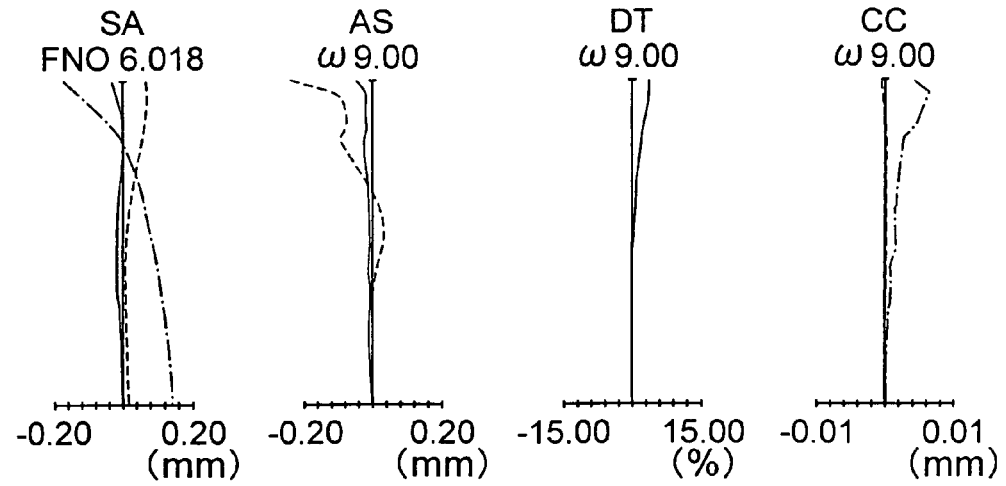

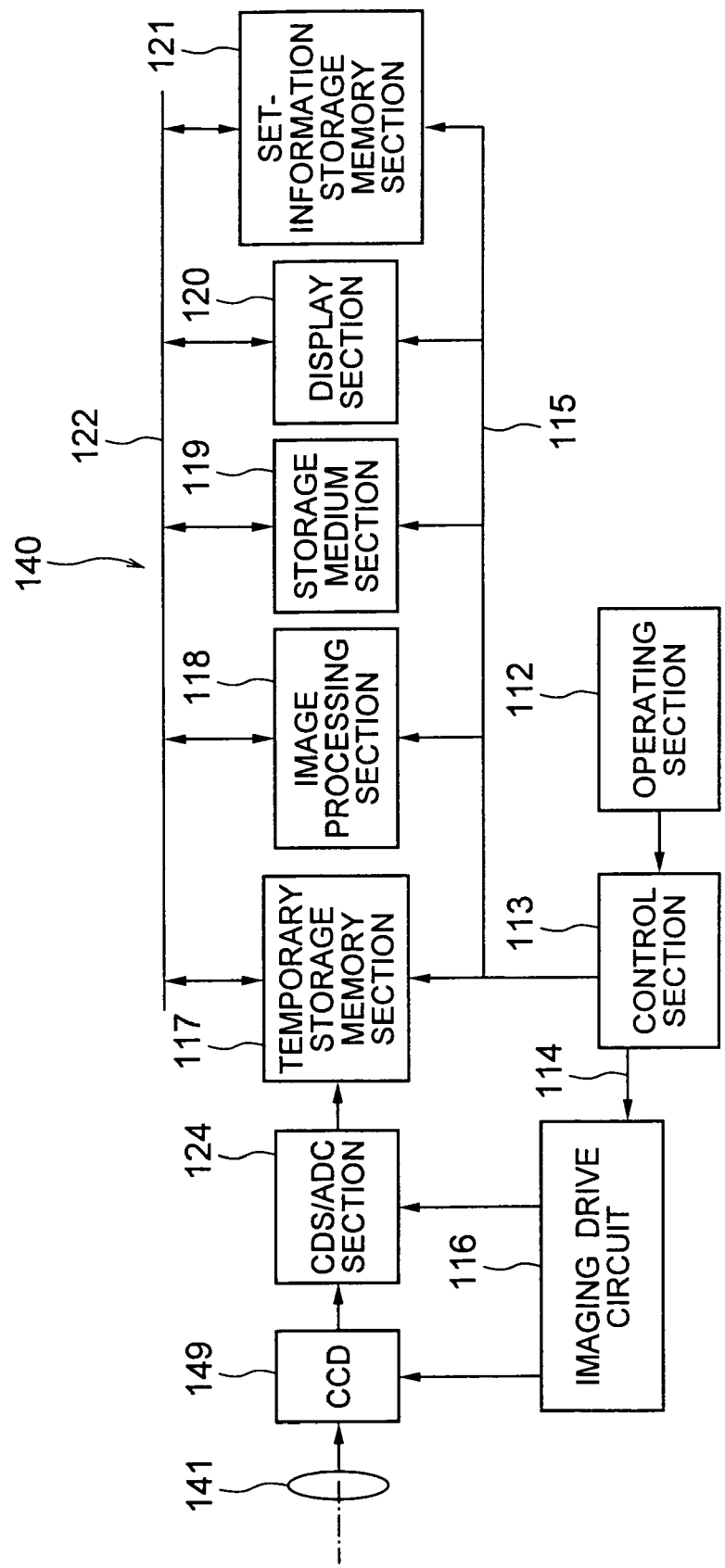

ZOOM LENS SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2008-322235 filed on Dec. 18, 2008, and 2008-322267 filed on Dec. 18, 2008; the entire contents of which are incorporated herein by reference.

BACKGROUND OF THE INVENTION

1. Field of the Invention

The present invention relates to a zoom lens system, and an image pickup apparatus using the same. Furthermore, the present invention relates to an image pickup apparatus such as a digital camera and a video camera, which includes the zoom lens system and an image pickup element.

2. Description of the Related Art

In recent years, replacing a silver-halide film camera, a digital camera in which, an object is photographed by using a solid image pickup device such as a CCD (Charge Coupled Device) and a CMOS (Complementary Metal Oxide Semiconductor) has become a mainstream. Several categories of digital cameras in wide range from a high-function type for professional use to a compact popular type have been used.

Particularly, among digital cameras of popular type, a small size camera, particularly, a slim digital camera which can be accommodated easily in a pocket of clothes or a bag, and carried conveniently has been preferred.

Moreover, while a zooming ratio of about 3 of a photographic lens has been common, a camera of the magnification ratio of 3 or more, capable of taking pictures with a wide image angle for fulfilling needs over a wide range of a user has been sought.

A photographic lens which responds to such needs is required to be of a size such that a portability of the camera is not lost.

As a means for slimming of a camera, a so-called collapsible lens barrel in which, a lens barrel is pushed out from inside of a camera body in a picture taking state, and is accommodated inside the camera body at the time of carrying has been typical.

Generally, as a type of a zoom lens system which can be made compact, a zoom lens system of a negative precedence type in which, a lens unit having a negative refracting power is nearest to an object side has been known. Among these, a three-unit zoom lens system in which, a first lens unit having a negative refracting power, a second lens unit having a positive refracting power, and a third lens unit having a positive refracting power are disposed in order from the object side to an image side has been commonly known.

Since the zoom lens system of the negative precedence type has a refracting power arrangement of a retro focus type as a whole, it is suitable for a widening an image angle, as compared to a zoom lens system of a type in which a lens unit of a positive refracting power precedes.

As a conventional zoom lens system of a negative precedence type, a four-unit zoom lens system in which, a first lens unit having a negative refracting power, a second lens unit having a positive refracting power, a third lens unit having a positive refracting power, and fourth lens unit having a negative refracting power are disposed in order from the object side to the image side for achieving a magnification ratio of 4 or more at a zoom lens system of a negative precedence has been disclosed in Japanese Patent Application Laid-open Publication Nos. 2004-318107, 2004-318108, and 2007-156385.

SUMMARY OF THE INVENTION

According to a first aspect of the present invention, there is provided a zoom lens system including, in order from an object side a first lens unit having a negative refracting power,
a second lens unit having a positive refracting power,
a third lens unit having a positive refracting power, and
a fourth lens unit having a negative refracting power, and
at the time of zooming from a wide angle end to a telephoto end, the second lens unit moves such that a distance between the first lens unit and the second lens unit decreases, and the first lens unit includes in order from the object side, one negative lens component having an aspheric surface at least on one surface, and one positive lens component, and the total number of lens components in the first lens unit is two, and the fourth lens unit includes one negative lens component having a surface on the object side as a concave surface, and the total number of lens components in the fourth lens unit is one, and the zoom lens system satisfies the following conditional expression (1A)

$$-4 < (R_{4a} + R_{4b})/(R_{4a} - R_{4b}) < -0.5 \quad (1A)$$

where, $R_{4a}$ denotes a paraxial radius of curvature of a surface on the object side, of the negative lens component in the fourth lens unit, and $R_{4b}$ denotes a paraxial radius of curvature of a surface on an image side, of the negative lens component in the fourth lens unit.

According to another aspect of the present invention, there is provided a zoom lens system including, in order from an object side a first lens unit having a negative refracting power,
a second lens unit having a positive refracting power,
a third lens unit having a positive refracting power, and
a fourth lens unit having a negative refracting power, and
at the time of zooming from a wide angle end to a telephoto end, the second unit is moved to the object side, and a distance between the first lens unit and the second lens unit decreases, and a distance between the second lens unit and the third lens unit increases, and a distance between the third lens unit and the fourth lens unit changes, and the first lens unit includes in order from the object side, one negative component having an aspheric surface at least on one surface, and one positive lens component, and the total number of lens components in the first lens unit is two, and the total number of lenses in the third lens unit is one, and the third lens unit includes a positive meniscus lens component of which, a surface on the object side is a concave surface, and which satisfies the following conditional expression (AB)

$$1.01 < (R_{3a} + R_{3b})/(R_{3a} - R_{3b}) < 30.0 \quad (AB)$$

where, $R_{3a}$ denotes a paraxial radius of curvature of a surface on the object side, of the positive meniscus lens component in the third lens unit, and $R_{3b}$ denotes a paraxial radius of curvature of a surface on an image side, of the positive meniscus lens component in the third lens unit.

Moreover, according to still another aspect of the present invention, there is provided an image pickup apparatus including a zoom lens system described above, and an image pickup element which is arranged at an image side of the zoom lens system, and which converts an optical image formed by the zoom lens system, into an electric signal.

BRIEF DESCRIPTION OF THE DRAWINGS

FIG. 1A shows a state at a wide angle end, FIG. 1B shows an intermediate state, and FIG. 1C shows a state at a telephoto end.

FIG. 10A, FIG. 10B, and FIG. 10C are aberration diagrams at the time of infinite object point focusing of the fourth embodiment;

FIG. 17 is a structural block diagram of an internal circuit of main components of a digital camera.

DETAILED DESCRIPTION OF THE INVENTION

Figure 1A:
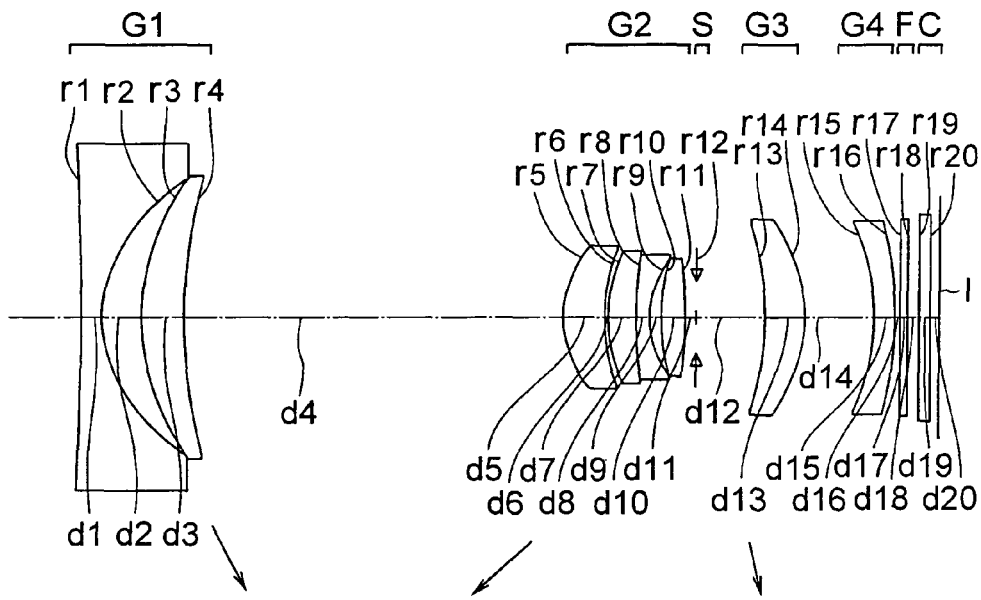
FIG. 1A, FIG. 1B, and FIG. 1C are cross-sectional views along an optical axis showing an optical arrangement at a time of infinite object point focusing according to a first embodiment of a zoom lens system of the present invention, where.

A zoom lens system according to a first aspect of the present invention includes in order from an object side, a first lens unit having a negative refracting power, a second lens unit having a positive refracting power, a third lens unit having a positive refracting power, and a fourth lens unit having a negative refracting power. At the time of zooming from a wide angle end to a telephoto end, the second lens unit moves such that a distance between the first lens unit and the second lens unit decreases, and distances between the other lens units change. The first lens unit comprises in order from the object side, one negative lens component having an aspheric surface at least on one surface, and one positive lens component. The fourth lens unit includes one negative lens component having a surface on the object side as a concave surface, and satisfies the following conditional expression (1A)

$$-4 \le (R_{4a}+R_{4b})/(R_{4a}-R_{4b}) \le -0.5 \quad (1A)$$

where, $R_{4a}$ denotes a paraxial radius of curvature of a surface on the object side, of the negative lens component in the fourth lens unit, and $R_{4b}$ denotes a paraxial radius of curvature of a surface on an image side, of the negative lens component in the fourth lens unit.

A lens component means a lens of only two surfaces, with surfaces in contact with air on an optical axis as a surface on the object side and a surface on the image side.

The zoom lens system according to the first aspect of the present invention is a four-unit zoom lens system with a negative-positive-positive-negative refracting power arrangement in order from the object side. Moreover, at the time of zooming from the wide angle end to the telephoto end, the second lens moves such that the distance between the first lens unit and the second lens unit decreases, and distances between the other lens units, change.

By making such an arrangement, the arrangement of lens units with a refracting power arrangement becomes such that it is susceptible to secure a wide image angle, and it is possible to impart a major zooming function to the second lens unit. Moreover, even when a positive refracting power of the third lens unit is made stronger to some extent, due to an effect of a negative refracting power of the fourth lens unit on the image side thereof, it is possible to secure a back focus, and an exit pupil can be separated easily from the image surface.

Moreover, making such an arrangement is advantageous also for having a high zooming ratio. Additionally, since an arrangement of the first lens unit has in order from the object side, the negative lens component and two positive lens components, it is easy to secure back focus, and it is advantageous also for the slimming of the first lens unit.

Furthermore, it is also advantageous for correction of an oblique aberration at the wide angle end, and a spherical aberration at the telephoto end.

Furthermore, by letting at least one lens surface of the negative lens component in the first lens unit to be an aspheric surface, it is advantageous for correction of the oblique aberration at the wide angle end, and it is easy to suppress an occurrence of aberration even when the refracting power of the negative lens is made stronger. Accordingly, it is advantageous for securing the negative refracting power of the entire first lens unit, and it is advantageous for shortening an overall length of the zoom lens system, thereby making it compact, or widening an image angle.

By letting the fourth lens unit to be one negative lens component having the surface on the object side to be a concave surface, it is easy to carry out an aberration correction of an off-axis light beam while suppressing an effect on a thickness of the zoom lens system when collapsed, and it is advantageous for reducing various aberrations from the wide angle end to the telephoto end.

Moreover, by the shape of the negative lens component in the fourth lens unit satisfying the conditional expression (1A), it is even more advantageous for securing an image angle and a zooming ratio at the wide angle end, and for securing a favorable optical performance over the total zoom range.

By making an arrangement such that a lower limit in the conditional expression (1A) is not surpassed, it is easy to suppress an occurrence of the spherical aberration at the telephoto end, and by making an arrangement such that an upper limit in the conditional expression (1A) is not surpassed, it is easy to suppress an occurrence of an curvature of field at the wide angle end.

Moreover, for solving the abovementioned issues, the zoom lens system according to a second aspect of the present invention includes in order from the object side, a first lens unit having a negative refracting power, a second lens unit having a positive refracting power, a third lens unit having a positive refracting power, and a fourth lens unit having a negative refracting power. Zooming from the wide angle end to the telephoto end is carried out by changing distances between the lens units. The first lens unit includes in order from the object side, one negative lens component having an aspheric surface at least on one surface, and one positive lens component, and the fourth lens unit includes one negative lens component, and satisfies the following conditional expressions (1A') and (2A).

$$-15<(R_{4a}+R_{4b})/(R_{4a}-R_{4b})<-0.5 \quad (1A')$$

$$0.5<D_T/f_t<2 \quad (2A)$$

where, $R_{4a}$ denotes a paraxial radius of curvature of a surface on the object side, of the negative lens component in the fourth lens unit, $R_{4b}$ denotes a paraxial radius of curvature of a surface on an image side, of the negative element in the fourth lens unit, $D_T$ denotes an optical axial distance up to an image forming surface from a surface on the object side of the lens nearest to the object, in the zoom lens system at the telephoto end, and $f_t$ denotes a focal length of the entire zoom lens system at the telephoto end.

A lens component means a lens of only two surfaces, with surfaces in contact with air, on an optical axis, as a surface on the object side and a surface on the image side.

The zoom lens system according to the second aspect of the present invention, similarly as the zoom lens system according to the first aspect of the present invention, is a four-unit zoom lens system with a negative-positive-positive, negative refracting power arrangement from the object side. Moreover, by the zoom lens system satisfying the conditional expression (1A') and the conditional expression (2A) simultaneously, it is advantageous for securing the image angle at the wide angle end, and the zooming ratio, and for securing a favorable optical performance over the total zoom range, and for compactness.

By making an arrangement such that a lower limit in the conditional expression (1A) is not surpassed, it is easy to suppress the occurrence of the spherical aberration at the telephoto end, and by making an arrangement such that an upper limit in the conditional expression (1A) is not surpassed, it is easy to suppress the occurrence of the curvature of field at the wide angle end.

Moreover, the conditional expression (2A) is an expression which specifies a preferable total length of the zoom lens system at the telephoto end. Satisfying the conditional expression (2A) is advantageous for achieving both, the compactness and securing of a refracting power which is necessary for each lens unit in the four-unit zoom lens system having the negative-positive-positive-negative arrangement.

By making an arrangement such that a lower limit in the conditional expression (2A) is not surpassed, it is advantageous for securing a favorable aberration performance over the total zoom range while suppressing the refracting power of each lens unit by securing the total length of the zoom lens system. By making an arrangement such that an upper limit in the conditional expression (2A) is not surpassed, it is advantageous for compactness and securing the total length of the zoom lens system.

When the zoom lens system includes a focusing mechanism, an arrangement is let to be such that, each of the arrangement-requirement mentioned above and below is an arrangement in which, the farthest object has been focused.

Moreover, the zoom lens system may be let to satisfy the abovementioned first aspect and the second aspect of the present invention.

It is preferable that the zoom lens system according to the first aspect and the second aspect of the present invention satisfies one or a plurality of the following items.

It is preferable that the negative lens component in the first lens unit has a biconcave shape, and for the biconcave negative lens component, an absolute value of a paraxial radius of curvature of a surface on the image side is smaller than an absolute value of a paraxial radius of curvature on the object side, and a surface on the object side of the positive lens component in the first lens unit has a shape of a meniscus which is a convex surface.

By letting the negative lens component and the positive lens component have the abovementioned shapes, an arrangement becomes such that it is easy to suppress an effect of the spherical aberration while maintaining the negative refracting power of the lens unit, and to achieve compactness in a collapsed state.

Moreover, it is preferable that the negative lens component in the fourth lens unit has an aspheric shape. Accordingly, it is even more advantageous for correction of the curvature of field.

Moreover, it is preferable that the negative lens component in the fourth lens unit is a single lens. This is advantageous for slimming in a collapsed state.

It is preferable that the zoom lens system according to the present invention satisfies the following conditional expression (3A).

$$0<(R_{1a}+R_{1b})/(R_{1a}-R_{1b})<1 \quad (3A)$$

where, $R_{1a}$ denotes a paraxial radius of curvature of a surface on the object side, of the negative lens component in the first lens unit, and $R_{1b}$ denotes a paraxial radius of curvature of a surface on the image side, of the negative lens component in the first lens unit.

By satisfying the conditional expression (3A), it is even more advantageous for securing the zooming ratio and the image angle at the wide angle end, and to secure a favorable performance over the total zoom range. The conditional expression (3A) specifies the preferable shape of the negative lens component in the first lens unit.

Dividing a negative power at the surface on the object side and the surface on the image side of the negative lens component such that the conditional expression (3A) is satisfied, is advantageous for correction of the spherical aberration at the telephoto end and the curvature of field when the image angle is widened.

By making an arrangement such that an upper limit in the conditional expression (3A) is not surpassed, it is easy to suppress an occurrence of the spherical aberration at the telephoto end and the curvature of field at the wide angle end due to a curvature of the length surface on the object side or the image side becoming excessively strong.

Moreover, it is preferable that the zoom lens system of the present invention satisfies the following conditional expressions (4A) and (5A).

$$1.81 < N_1 < 2.15 \quad (4A)$$

$$1.9 < N_2 < 2.35 \quad (5A)$$

where, $N_1$ denotes a refractive index for a d-line of one of the negative lenses in the negative lens components in the first lens unit, and $N_2$ denotes a refractive index for a d-line of one of the positive lenses in the positive lens components in the first lens unit.

Accordingly, it is advantageous for securing the image angle at the wide angle end and securing the zooming ratio, securing a favorable performance over the total zoom range.

By satisfying the conditional expression (4A), it is possible to make small a curvature of the surface on the image side of the negative lens component, and to correct favorably the curvature of field at the wide angle end. Moreover, since it is possible to make small an edge thickness difference of the negative lens component, it is advantageous for compactness of the first lens unit.

Making an arrangement such that a lower limit in the conditional expression (4A) is not surpassed is advantageous for correction of the spherical aberration at the telephoto end the curvature of field at the wide angle end. Moreover, it is possible to make small the edge thickness difference of the negative lens component, thereby leading to the compactness of the first lens unit.

By making an arrangement such that an upper limit in the conditional expression (4A) is not surpassed, it is easy to suppress a cost of material and a processing cost of the lens surface.

Satisfying the conditional expression (5A) is advantageous for correction of the spherical aberration at the telephoto end and the curvature of field at the wide angle end, while suppressing an axial thickness of the positive lens component.

By making an arrangement such that a lower limit in the conditional expression (5A) is not surpassed, it is easy to suppress the spherical aberration at the telephoto end and the curvature of field at the wide angle end. Moreover, since it is possible to make small an absolute value of curvature of the image side, the axial thickness of the positive lens is reduced, thereby leading to a compactness of the first lens unit.

By making an arrangement such that an upper limit in the conditional expression (5A) is not surpassed, it is easy to suppress the cost of the material and the processing cost of the lens surface.

Moreover, it is preferable that the third lens unit moves at the time of zooming from the wide angle end to the telephoto end, and focusing is carried out by moving the third lens unit in the optical axial direction.

It is possible that the second lens unit bears the zooming function, and the third lens unit bears a function of carrying out an adjustment of an image position. In the present invention, even when the refracting power of the third lens unit is increased, it is easy to secure telecentricity. Therefore, even by suppressing an amount of movement of the third lens unit, it is possible to carry out the function of adjusting the image plane position.

Moreover, it is preferable that each of the negative lens component and the positive lens component in the first lens unit is one single lens made of glass. Accordingly, it is advantageous for compactness and for securing the refracting power of each lens component.

Moreover, it is preferable to dispose an aperture stop immediately after the image side of the second lens unit.

To achieve a high zooming ratio by a negative precedence type zoom lens system, making increasing a zooming effect of the second lens unit is effective. For this, it is preferable to dispose the aperture stop on a rear side of the second lens unit.

When the aperture stop is disposed at the object side of the second lens unit, it is difficult to make small an axial air space between the first lens unit and the second lens unit. However, by disposing the aperture stop immediately after the image side of the second lens unit, it is possible to reduce the distance between the first lens unit and the second lens unit without any mechanical constraint. Accordingly, it is advantageous for securing the amount of movement of the second lens unit at the time of zooming, and for achieving both of the compactness and securing of the zooming ratio.

Furthermore, it is preferable that a refracting surface nearest to the image side, of the first lens unit is a concave surface directed toward the image side, and a refracting surface nearest to the object side of the second lens unit is a convex surface directed toward the object side. Such shape is advantageous for the aberration correction near the wide angle end. Moreover, it is easy to bring principal points of the second lens unit at the telephoto end closer to the first lens unit, and it is advantageous for both, the compactness and securing of the zooming ratio.

Moreover, it is preferable that the zoom lens system of the present invention satisfies the following conditional expression (6A).

$$3.6 < f_t/f_w < 10 \quad (6A)$$

where, $f_w$ denotes a focal length of the entire zoom lens system, at the wide angle end, and $f_t$ denotes a focal length of the entire zoom lens system, at the telephoto end.

The conditional expression (6A) is related to a preferable zooming ratio of the zoom lens system.

By making an arrangement such that a lower limit in the conditional expression (6A) is not surpassed, the zooming ratio is secured, which is preferable from a view point of exerting the function of the present invention. By making an arrangement such that an upper limit in the conditional expression (6A) is not surpassed, it is easy to reduce size and cost. Moreover, it is easy to have favorable optical performance.

An image pickup apparatus of the present invention includes one of the abovementioned zoom lens systems, and an image pickup element which is disposed at an image side of the zoom lens system, and which converts an optical image formed by the zoom lens system into an electric signal. Accordingly, it is possible to provide an image pickup apparatus having a favorable balance of widening of an image angle, having a high zooming ratio, and compactness.

Furthermore, it is preferable that the image pickup apparatus of the present invention includes an image converting section which converts an electric signal including a distortion due to the zoom lens system into an image signal in which, the distortion is corrected by image processing.

It is possible to record and display an image upon correcting electrically the distortion of the zoom lens system. Consequently, by allowing an occurrence of aberration of the distortion of the zoom lens system, it is advantageous for the correction of the curvature of field and coma aberration, and as a result, it is easy to achieve a favorable image quality by a small-size zoom lens system.

Moreover, it is preferable that the image pickup apparatus of the present invention includes an image converting section which converts an electric signal including a chromatic aberration of magnification due to the zoom lens system into an image signal in which, the chromatic aberration of magnification is corrected by image processing.

Furthermore, it is preferable that the image pickup apparatus of the present invention includes an image converting section which converts an electric signal of an image taken by the zoom lens system into an image signal in which, a color shift due to the chromatic aberration of magnification is corrected by image processing. By correcting electrically the chromatic aberration of magnification it is possible to achieve even more favorable image.

By allowing the chromatic aberration of magnification of the zoom lens system, it is possible to secure freedom of selecting lens material, and it is advantageous for cost reduction, slimming, and improved performance.

Moreover, it is desirable to apply a reflection preventing coating at least on one surface of the lenses forming the zoom lens system of the present invention.

It is preferable that the zoom lens system of the present invention satisfies a plurality of the abovementioned conditional expressions. When an upper limit value or a lower limit value or both the upper limit value and the lower limit value are restricted as described below in each of the conditional expressions, it is easier to achieve the desired effect.

In the conditional expressions (1A) and (1A'), it is preferable to let the lower limit value to be −3.8, and −3.6 is more preferable. It is preferable to let the upper limit value to be −0.1, and −0.2 is more preferable.

In the conditional expression (2A), it is preferable to let the lower limit value to be 0.8, and 1.2 is more preferable. It is preferable to let the upper limit value to be 1.9, and 1.8 is more preferable.

In the conditional expression (3A), it is preferable to let the lower limit value to be 0.3, and 0.55 is more preferable. It is preferable to let the upper limit value to be 0.95, and 0.92 is more preferable.

In the conditional expression (4A), it is preferable to let the lower limit value to be 1.83, and 1.85 is more preferable. It is preferable to let the upper limit value to be 2.00, and 1.90 is more preferable.

In the conditional expression (5A), it is preferable to let the lower limit to be 1.95, and 2.00 is more preferable. It is preferable to let the upper limit value to be 2.25, and 2.15 is more preferable.

In conditional expression (6A), it is preferable to let a lower limit value to be 4.3, and 4.6 is more preferable. It is preferable to let an upper limit value to be 8.0, and 6.0 is more preferable.

Moreover, the zoom lens system of the present invention includes in order from the object side, a first lens unit having a negative refracting power, a second lens unit having a positive refracting power, a third lens unit having a positive refracting power, and a fourth lens unit having a negative refracting power. At the time of zooming from the wide angle end to the telephoto end, the second lens unit moves to the object side, and a distance between the first lens unit and the second lens unit decreases, and a distance between the second lens unit and the third lens unit increases, and a distance between the third lens unit and the fourth lens unit changes. The first lens unit includes one negative lens component having an aspheric surface at least on one surface, and one positive lens component, in order from the object side. The third lens unit includes a positive meniscus lens component of which, a surface on the object side is a concave surface, and which satisfies the following conditional expression (AB).

$$1.01 < (R_{3a}+R_{3b})/(R_{3a}-R_{3b}) < 30.0 \quad (AB)$$

where, $R_{3a}$ denotes a paraxial radius of curvature of a surface on the object side, of the positive meniscus lens component in the third lens unit, and $R_{3b}$ denotes a paraxial radius of curvature of a surface on an image side, of the positive meniscus lens component in the third lens unit.

A lens component means a lens of only two surfaces, with surfaces in contact with air on an optical axis as a surface on the object side and a surface on the image side.

The zoom lens system of the present invention is a four-unit zoom lens system with a negative-positive-positive-negative refracting power arrangement, in order from the object side. Moreover, at the time of zooming from the wide angle end to the telephoto end, the second lens unit moves such that the distance between the first lens unit and the second lens unit decreases, the distance between the second lens unit and the third lens unit increases, and distances between the other lens units change.

By making such an arrangement, the arrangement of lens units with a refracting power arrangement becomes such that it is susceptible to secure a wide image angle, and it is possible to impart a major zooming function to the second lens unit. Moreover, even when a positive refracting power of the third lens unit is made stronger to some extent, due to an effect of a negative refracting power of the fourth lens unit on the image side thereof, it is possible to secure a back focus, and an exit pupil can be separated easily from the image surface.

Moreover, making such an arrangement is advantageous also for having a high zooming ratio.

In addition, since an arrangement of the first lens unit has in order from the object side, the negative lens component and two positive lens components, it is easy to secure back focus, and it is advantageous also for the slimming of the first lens unit.

Furthermore, it is also advantageous for correction of an oblique aberration at the wide angle end, and a spherical aberration at the telephoto end.

Furthermore, by letting at least one lens surface of the negative lens component in the first lens unit to be an aspheric surface, it is advantageous for correction of the oblique aberration at the wide angle end, and it is easy to suppress an occurrence of aberration even when the refracting power of the negative lens is made stronger. Accordingly, it is advantageous for securing the negative refracting power of the entire first lens unit, and it is advantageous for shortening an overall length of the zoom lens system, thereby making it compact, or widening an image angle.

Moreover, the third lens unit includes one positive meniscus lens component having a concave surface directed toward the object side. In the four-unit zoom lens system of negative-positive-positive-negative type of the present invention, an adjustment of imaging position is carried out at a lens unit on the object side of the second lens unit. Here, by letting the third lens unit to have a meniscus shape having a concave surface directed toward the object side, even when a height of light rays in the third lens unit changes, it is possible to make small a change in an angle of incidence and an angle of emergence of off-axis rays, and it is advantageous for reduction in fluctuation of the curvature of field.

Conditional expression (AB) specifies a preferable shape of the positive meniscus component.

By making an arrangement such that an upper limit and a lower limit of the conditional expression (AB) are not surpassed, a surface on the object side of the positive meniscus component becomes a concave surface of an appropriate curvature, and it is advantageous for reduction in fluctuation of the curvature of field, and advantageous for widening the image angle and having a high zooming ratio.

When the zoom lens system includes a focusing mechanism, an arrangement is let to be such that, each of the arrangement-requirement mentioned above and below is an arrangement in which, the farthest object has been focused.

Moreover, in each of the abovementioned inventions, it is more preferable that one or a plurality of the items of arrangement described below, are satisfied.

It is preferable that the zoom lens system of the present invention satisfies the following conditional expression (BB).

$$-0.60 < L_1/L_2 < -0.20 \quad \text{(BB)}$$

where, $L_1$ denotes a focal length of the negative lens element in the first lens unit, and $L_2$ denotes a focal length of the positive lens element in the first lens unit.

The conditional expression (BB) is for securing small-sizing and optical performance while securing the refracting power of the first lens unit, and is for specifying a preferable ratio of focal lengths of the negative lens component and the positive lens component in the first lens unit.

By making an arrangement such that a lower limit in the conditional expression (BB) is not surpassed, the refracting power of the negative lens component is secured, which is advantageous for securing the refracting power of the first lens unit.

By making an arrangement such that an upper limit in the conditional expression (BB) is not surpassed, the refracting power of the positive lens component is secured, thereby making it easy to make a diameter small and to carry out an aberration correction of the first lens unit.

Moreover, it is preferable that the second lens unit includes at least one negative lens and at least two positive lenses.

This is advantageous for correction of the second lens unit, and it is easy to secure the refracting power of the second lens unit.

Moreover, it is preferable that the second lens unit includes at least three positive lenses, and one of the positive lenses is cemented to one of the negative lenses.

In the zoom lens system of the present invention, it is preferable that the first lens unit and the second lens unit satisfy the following conditional expression (CB).

$$-1.7 < f_1/f_2 < -0.7 \quad \text{(CB)}$$

where, $f_1$ denotes a focal length of the first lens unit, and
$f_2$ denotes a focal length of the second lens unit.

The conditional expression (CB) specifies the preferable ratio of a focal length of the first lens unit and a focal length of the second lens unit.

By making an arrangement such that a lower limit in the conditional expression (CB) is not surpassed, the negative refracting power of the first lens component is secured, thereby making it advantageous for securing the zooming ratio, and it is easy to reduce the occurrence of aberration in the second lens unit.

By making an arrangement such that an upper limit in the conditional expression (CB) is not surpassed, a refracting power strain of the first lens unit is suppressed, thereby making it advantageous for slimming and reduction in aberration of the first lens unit.

In the zoom lens system of the present invention, it is preferable that the fourth lens unit includes one negative lens component having a surface on the object side to be a concave surface, which satisfies the following conditional expression (1B).

$$-15 < (R_{4a}+R_{4b})/(R_{4a}-R_{4b}) < -0.5 \quad \text{(1B)}$$

where, $R_{4a}$ denotes a paraxial radius of curvature of a surface on the object side, of the negative lens component in the fourth lens unit, and $R_{4b}$ denotes a paraxial radius of curvature of a surface on the image side, of the, negative lens component in the fourth lens unit.

By letting the fourth lens unit to be one negative lens component having a surface on the object side to be a concave surface, it is possible to carry out the aberration correction for the off-axis rays while suppressing an effect on the thickness of the zoom lens system in a collapsed state, and it is advantageous for reduction of various aberrations from the wide angle end to the telephoto end.

By the shape of the negative lens component in the fourth lens unit satisfying the conditional expression (1B), it is advantageous for securing the zooming ratio and the image angle at the wide angle end, and to secure the favorable optical performance over total zoom range.

By making an arrangement such that a lower limit in the conditional expression (1B) is not surpassed, it is easy to suppress the occurrence of the spherical aberration at the telephoto end. By making an arrangement such that an upper limit in the conditional expression (1B) is not surpassed, it is easy to suppress the occurrence of the curvature of field at the wide angle end.

It is preferable that the zoom lens system of the present invention satisfies the following conditional expression (2B).

$$0.5 < D_T/f_t < 2 \quad \text{(2B)}$$

where, $D_T$ denotes an optical axial distance up to an image forming surface from a surface on the object side of the lens nearest to the object side, in the zoom lens system at the telephoto end, and $f_t$ denotes a focal length of the entire zoom lens system at the telephoto end.

The conditional expression (2B) specifies the preferable total length of the zoom lens system at the telephoto end.

By satisfying the conditional expression (2B), it is advantageous for achieving both, the compactness and securing the refracting power which is necessary for each lens unit in the four-unit zoom lens system of the negative-positive-positive-negative arrangement.

By making an arrangement such that a lower limit in the conditional expression (2B) is not surpassed, the total length of the zoom lens system is secured, which is advantageous for securing a favorable aberration performance in the total zoom range while suppressing the refracting power of each lens unit.

By making an arrangement such that an upper limit in the conditional expression (2B) is not surpassed, the total length of the zoom lens system is suppressed, which is advantageous for compactness of the zoom lens system.

In the zoom lens system of the present invention, it is preferable that the negative lens component in the first lens unit has a biconcave shape, and for the biconcave negative lens component, an absolute value of a paraxial radius of curvature of a surface on an image side is smaller than an absolute value of a paraxial radius of curvature on the object side, and a surface on the object side of the positive lens component in the first lens unit has a shape of a meniscus which is a convex surface.

By letting the shape of the negative lens component and the positive lens component to be the abovementioned shape, it is easy to suppress an effect of the spherical aberration while maintaining the negative refracting power of the lens unit, and making the size small in a collapsed state. Therefore, it is even more advantageous for the correction of the spherical aberration at the telephoto end at the time of high zooming.

Moreover, in the zoom lens system of the present invention, it is desirable that the negative lens component in the fourth lens unit has an aspheric shape. Accordingly, it is even more advantageous for correction of the curvature of field.

In the zoom lens system of the present invention, it is desirable that the negative lens component in the fourth lens unit is a single lens. This is advantageous for slimming in a collapsed state.

It is preferable that the zoom lens system of the present invention satisfies the following conditional expression (3B).

$$0<(R_{1a}+R_{1b})/(R_{1a}-R_{1b})<1 \quad (3B)$$

where, $R_{1a}$ denotes a paraxial radius of curvature of a surface on the object side, of the negative lens component in the first lens unit, and $R_{1b}$ denotes a paraxial radius of curvature of a surface on the image side, of the negative lens component in the first lens unit.

By satisfying the conditional expression (3B), it is even more advantageous for securing the zooming ratio and image angle at the wide angle end, and to secure the favorable performance in the total zoom range.

The conditional expression (3B) specifies the preferable shape of the negative lens component in the first lens unit.

By dividing the negative power to the surface on the object side and the surface on the image side of the negative lens component such that the conditional expression (3B) is satisfied, it is advantageous for the correction of the spherical aberration at the telephoto end and the curvature of field when the image angle is widened.

By making an arrangement such that an upper limit and a lower limit in the conditional expression (3B) are not surpassed, it is easy to suppress the occurrence of the spherical aberration at the telephoto end and the curvature of field at the wide angle end due to a curvature of one of the lens surface on the object side and the lens surface on the image side becoming excessively strong.

Moreover, it is preferable that the zoom lens system of the present invention satisfies the following conditional expressions (4B) and (5B).

$$1.81<N_1<2.15 \quad (4B)$$

$$1.9<N_2<2.35 \quad (5B)$$

where, $N_1$ denotes a refractive index at a d-line of one of the negative lenses in the negative lens components in the first lens unit, and $N_2$ denotes a refractive index at a d-line of one of positive lenses in the positive lens components in the first lens unit.

Accordingly, it is advantageous for securing the image angle at the wide angle end, and the zooming ratio, and for securing the favorable performance over the total zoom range.

By satisfying the conditional expression (4B), it is possible to make small a curvature of the surface on the image side of the negative lens component, and to correct favorably the curvature of field at the wide angle end. Moreover, since it is possible to make small the edge thickness difference of the negative lens component, it is advantageous for small sizing of the first lens unit.

By making an arrangement such that a lower limit in the conditional expression (4B) is not surpassed, it is advantageous for the correction of the spherical aberration at the telephoto end and the curvature of field at the wide angle end. Moreover, it is possible to make small the edge thickness difference of the negative lens component, which leads to the small sizing of the first lens unit.

By making an arrangement such that an upper limit in the conditional expression (4B) is not surpassed, it is easy to suppress the cost of the material and the processing cost of the lens surfaces.

By satisfying the conditional expression (5B), it is advantageous for the correction of the spherical aberration at the telephoto end and the curvature of field at the wide angle end while suppressing an axial thickness of the positive lens component. Moreover, it is also easy to secure the edge thickness difference of the positive lens component.

By making an arrangement such that a lower limit in the conditional expression (5B) is not surpassed, it is easy to suppress the spherical aberration at the telephoto end and the curvature of field at the wide angle end. Moreover, since it is possible to make small an absolute value of the curvature on the image side, the axial thickness of the positive lens is reduced, thereby leading to small sizing of the first lens unit.

By making an arrangement such that an upper limit in the conditional expression (5B) is not surpassed, it is easy to suppress the cost of the material and the processing cost of the lens surfaces.

Moreover, in the zoom lens system of the present invention, it is preferable that the third lens unit moves at the time of zooming from the wide angle end to the telephoto end, and focusing is carried out by moving the third lens unit in the optical axial direction.

It is possible to impart the zooming function to the second lens unit, and to impart a function of carrying out an adjustment of an image position to the third lens unit. In the present invention, since it is possible to reduce the fluctuation in the curvature of field even when the refracting power of the third lens unit is increased, it is preferable to move the third lens unit at the time of focusing.

Moreover, in the zoom lens system of the present invention, it is preferable that each of the negative lens component and the positive lens component in the first lens unit is one single lens made of glass.

This is advantageous for small sizing and securing of the refracting power of each lens component.

Moreover, in the zoom lens system of the present invention, it is preferable to dispose an aperture stop immediately after the image side of the second lens unit.

For achieving a high zooming ratio in the zoom lens system of negative precedence type, making increasing the zooming effect of the second lens unit is effective. For this, it is preferable to dispose the aperture stop on a rear side of the second lens unit.

When the aperture stop is disposed at the object side of the second lens unit, it is difficult to make small an axial air space between the first lens unit and the second lens unit. However, by disposing the aperture stop immediately after the image side of the second lens unit, it is possible to reduce the distance between the first lens unit and the second lens unit without any mechanical constraint. Therefore, it is advantageous for securing the amount of movement of the second lens unit at the time of zooming, and for achieving both the compactness and for securing the zooming ratio.

Furthermore, it is preferable that a surface nearest to the image side, of the first lens unit is a concave surface directed toward the image side, and a refracting surface nearest to the object side of the second lens unit is a convex surface directed toward the object side. It is easy to bring the principal points of the second lens unit at the telephoto end closer to the first lens unit while letting the shape of the refracting surface to be advantageous for the aberration correction near the wide angle end, and it is advantageous for securing the small sizing and zooming ratio.

Moreover, it is preferable that the zoom lens system according to the present invention satisfies the following conditional expression (6B).

$$3.6 < f_t/f_w < 10 \quad (6B)$$

where, $f_w$ denotes a focal length of the entire zoom lens system, at the wide angle end, and $f_t$ denotes a focal length of the entire zoom lens system, at the telephoto end.

The conditional expression (6B) is related to the preferable zooming ratio of the zoom lens system.

By making an arrangement such that a lower limit in the conditional expression (6B) is not surpassed, the zooming ratio is secured, which is preferable for exerting the function of the present invention.

By making an arrangement such that an upper limit in the conditional expression (6B) is not surpassed, it is easy to reduce the size and cost. Moreover, it is easy to make the optical performance favorable.

Moreover, an image pickup apparatus of the present invention includes one of the abovementioned zoom lens systems, and an image pickup element which is disposed at an image side of the zoom lens system, and which converts an optical image formed by the zoom lens system into an electric image.

Accordingly, it is possible to provide an image pickup apparatus having a favorable balance of widening of the image angle, high zooming ratio, and small sizing.

Furthermore, it is preferable that the image pickup apparatus of the present invention includes an image converting section which converts an electric signal including a distortion due to the zoom lens system into an image signal in which, the distortion is corrected by image processing.

It is possible to record and display an image upon correcting electrically the distortion of the zoom lens system. Consequently, by allowing an occurrence of aberration of the distortion of the zoom lens system, it is advantageous for the correction of the curvature of field and coma aberration, and as a result, it is easy to achieve a favorable image quality by a small-size zoom lens system.

Moreover, it is preferable that the image pickup apparatus of the present invention includes an image converting section which converts an electric image including a chromatic aberration of magnification due to the zoom lens system into an image signal in which, the chromatic aberration of magnification is corrected by image processing.

Furthermore, it is preferable that the image pickup apparatus of the present invention includes an image converting section which converts an electric signal of an image taken by the zoom lens system into an image signal in which, a color shift due to the chromatic aberration of magnification is corrected by image processing. By correcting electrically the chromatic aberration of magnification, it is possible to achieve even more favorable image.

By allowing the chromatic aberration of magnification of the zoom lens system, it is possible to secure freedom of selecting the lens material, and it is advantageous for cost reduction, slimming, and improved performance.

Moreover, it is desirable to apply a reflection preventing coating at least on one surface of the lenses forming the zoom lens system of the present invention.

It is preferable that the zoom lens system of the present invention satisfies a plurality of the abovementioned conditional expressions. When an upper limit value or a lower limit value or both the upper limit value and the lower limit values are restricted as described below in each of the conditional expressions, it is easier to achieve the desired effect.

In the conditional expression (AB), it is preferable to let the lower limit value to be 1.5, and 2.0 is more preferable. It is preferable to let the upper limit value to be 20.0, and 10.0 is more preferable.

In the conditional expression (BB), it is preferable to let the lower limit value to be −0.50, and −0.40 is more preferable. It is preferable to let the upper limit value to be −0.25, and −0.3 is more preferable.

In the conditional expression (CB), it is preferable to let the lower limit value to be −1.3, and −1.0 is more preferable. It is preferable to let the upper limit value to be −0.55, and −0.4 is more preferable.

In the conditional expression (1B), it is preferable to let the lower limit value to be −4.0, and −3.8 is more preferable. It is preferable to let the upper limit value to be −1.0, and −2.0 is more preferable.

In the conditional expression (2B), it is preferable to let the lower limit value to be 0.8, and 1.2 is more preferable. It is preferable to let the upper limit value to 1.9, and 1.8 is more preferable.

In the conditional expression (3B), it is preferable to let the lower limit value to be 0.3, and 0.55 is more preferable. It is preferable to let the upper limit value to be 0.95, and 0.92 is more preferable.

In the conditional expression (4B), it is preferable to let the lower limit value to be 1.83, and 1.85 is more preferable. It is preferable to let the upper limit value to be 2.00, and 1.90 is more preferable.

In the conditional expression (5B), it is preferable to let the lower limit value to be 1.95, and 2.00 is more preferable. It is preferable to let the upper limit value to be 2.25, and 2.15 is more preferable.

In the conditional expression (6B), it is preferable to let the lower limit value to be 4.3, and 4.6 is more preferable. It is preferable to let the upper limit value to be 8.0, and 6.0 is more preferable.

Exemplary embodiments of the zoom lens system and the image pickup apparatus according to the present invention will be described below in detail by referring to the accompanying diagrams. However, the present invention is not restricted to the embodiments described below.

Embodiments from a first embodiment to a sixth embodiment of the zoom lens system of the present invention will be described below. Lens cross-sectional view of a state at a wide angle end (FIG. 1A, FIG. 2A, FIG. 3A, FIG. 4A, FIG. 5A, and FIG. 6A), an intermediate state (FIG. 1B, FIG. 2B, FIG. 3B, FIG. 4B, FIG. 5B, and FIG. 6B), and a state at a telephoto end of an infinite object point focusing according to the first embodiment to the sixth embodiment are shown in FIG. 1A, FIG. 1B, and FIG. 1C to FIG. 6A, FIG. 6B, and FIG. 6C (hereinafter, 'FIG. 1A to FIG. 6C'). In FIG. 1A to FIG. 6C, G1 denotes a first lens unit, G2 denotes a second lens unit, G3 denotes a third lens unit, G4 denotes a fourth lens unit, S denotes an aperture stop, F denotes a parallel flat plate which forms a low pass filter in which, a wavelength region restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have a low pass filter effect.

Moreover, in each of the embodiments, the aperture stop S moves integrally with the second lens unit G2. Numerical data of each embodiment is data in a state in which, an object at an infinite is focused. A unit of length of each value is mm, and a unit of angle is degrees (°). Focusing in each embodiment is carried out by moving the third lens unit G. Furthermore, zoom data are values at the wide angle end (WE), the intermediate zoom state (ST) defined in the present invention, and the telephoto end (TE).

Figure 1B:
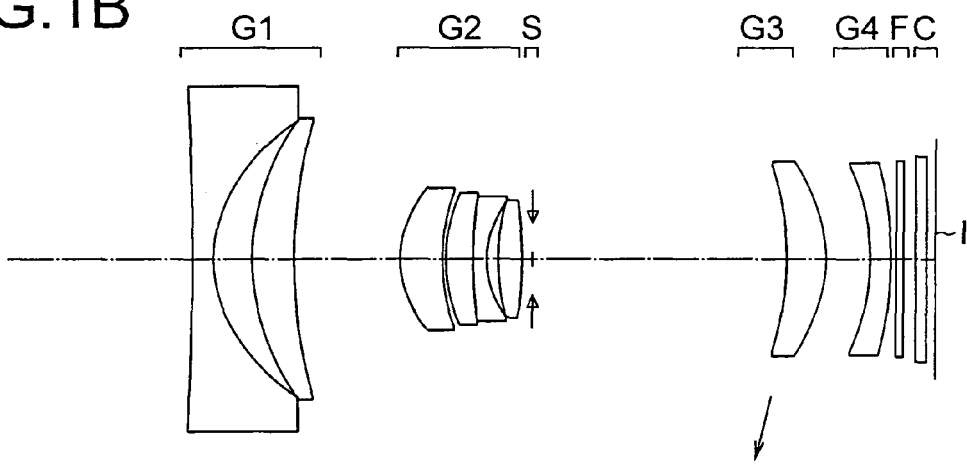
Figure 1C:
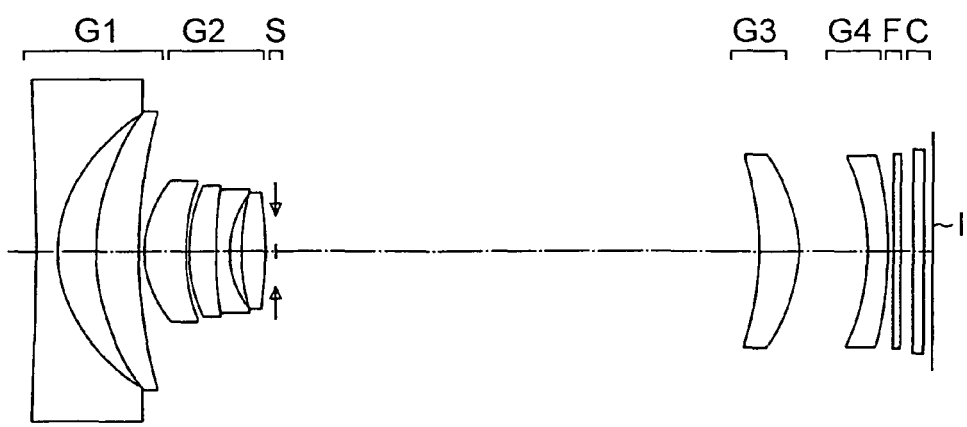

A zoom lens system in the first embodiment, as shown in FIG. 1A, FIG. 1B, and FIG. 1C, includes in order from an object side, a first lens unit G1 having a negative refracting power, a second lens unit G2 having a positive refracting power, an aperture stop S, a third lens unit G3 having a positive refracting power, and a fourth lens unit G4 having a negative refracting power.

At the time of zooming from the wide angle end to the telephoto end, the first lens unit G1, after moving toward the image side, moves toward the object side. The second lens unit G2 moves toward the object side. The third lens unit G3, after moving toward the image side, moves toward the object side. The fourth lens unit G4 is fixed.

In order from the object side, the first lens unit G1 includes a biconcave negative lens and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a biconvex positive lens. The third lens unit G3 includes a positive meniscus lens having a convex surface directed toward the image side. The fourth lens unit G4 includes a negative meniscus lens having a concave surface directed toward the object side.

An aspheric surface is provided to seven surfaces namely, both surfaces of the biconcave negative lens in the first lens unit, both surfaces of the positive meniscus lens on the object side in the second lens unit G2, both surfaces of the positive meniscus lens in the third lens unit G3, and a surface on the object side of the negative meniscus lens in the fourth lens unit G4.

Figure 2A:
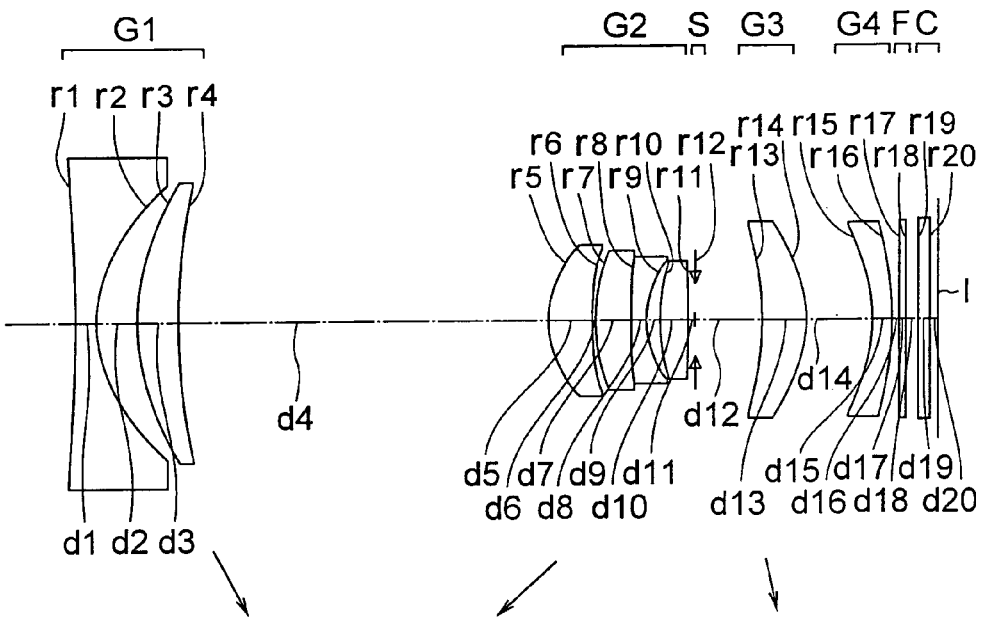
FIG. 2A, FIG. 2B, and FIG. 2C are diagrams similar to FIG. 1A, FIG. 1B, and FIG. 1C respectively, according to a second embodiment of the zoom lens system according to the present invention.
Figure 2B:
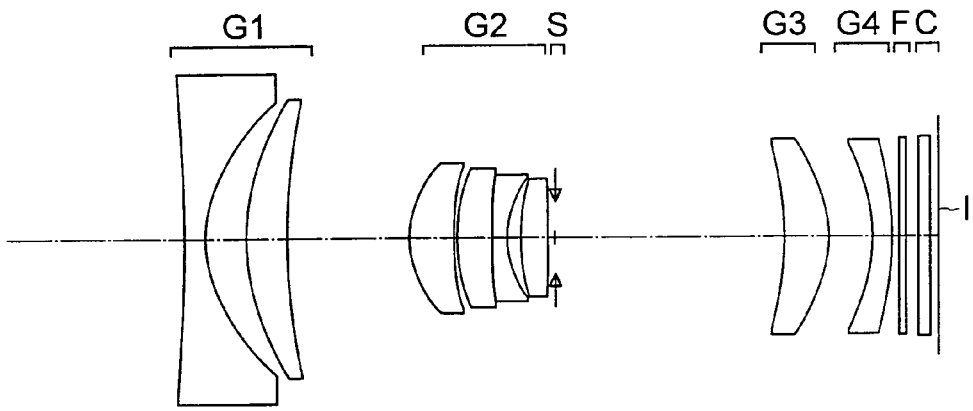
Figure 2C:
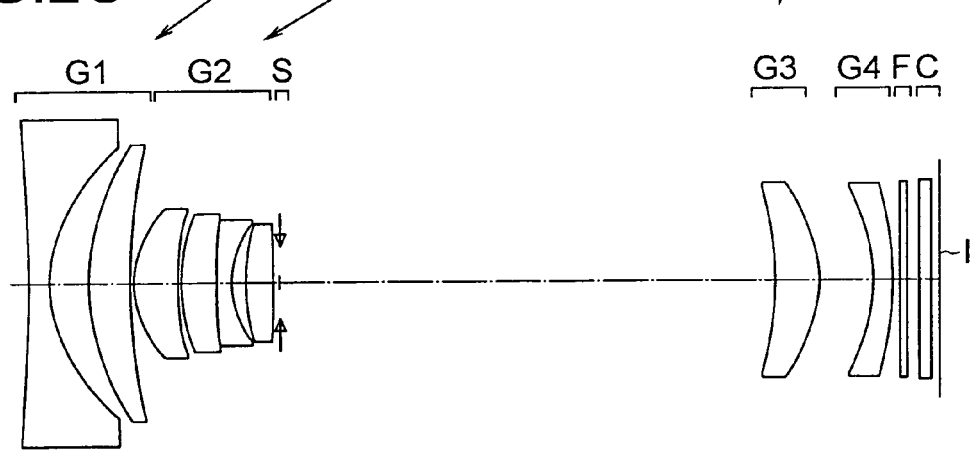

A zoom lens system in the second embodiment, as show in FIG. 2A, FIG. 2B, and FIG. 2C, includes in order from the object side, a first lens unit G1 having a negative refracting power, a second lens unit G2 having a positive refracting power, an aperture stop S, a third lens unit G3 having a positive refracting power, and a fourth lens unit G4 having a negative refracting power.

At the time of zooming from the wide angle end to the telephoto end, the first lens unit G1, after moving toward the image side, moves to the object side, the second lens unit G2 moves toward the object side, the third lens unit G3, after moving toward the image side, moves toward the object side. The fourth lens unit G4 is fixed.

In order from the object side, the first lens unit G1 includes a biconcave negative lens and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a biconvex positive lens. The third lens unit G3 includes a positive meniscus lens having a convex surface directed toward the image side. The fourth lens unit G4 includes a negative meniscus lens having a concave surface directed toward the object side.

An aspheric surface is provided to seven surfaces namely, both surfaces of the biconcave negative lens in the first lens unit G1, both surfaces of the positive meniscus lens on the object side in the second lens unit G2, both surfaces of the positive meniscus lens in the third lens unit G3, and a surface on the object side of the negative meniscus lens in the fourth lens unit G4.

Figure 3A:
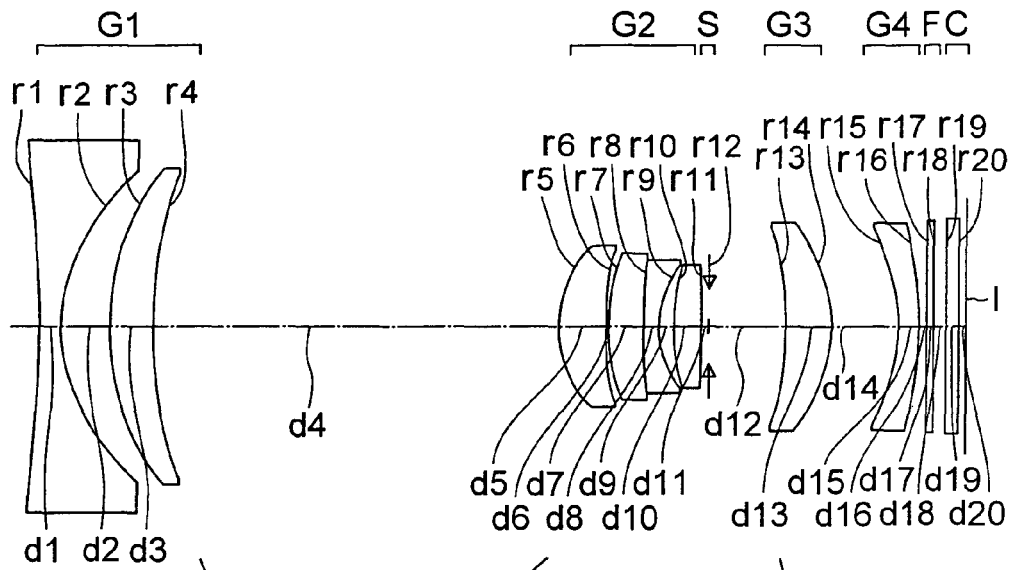
FIG. 3A, FIG. 3B, and FIG. 3C are diagrams similar to FIG. 1A, FIG. 1B, and FIG. 1C respectively, according to a third embodiment of the zoom lens system of the present invention.
Figure 3B:
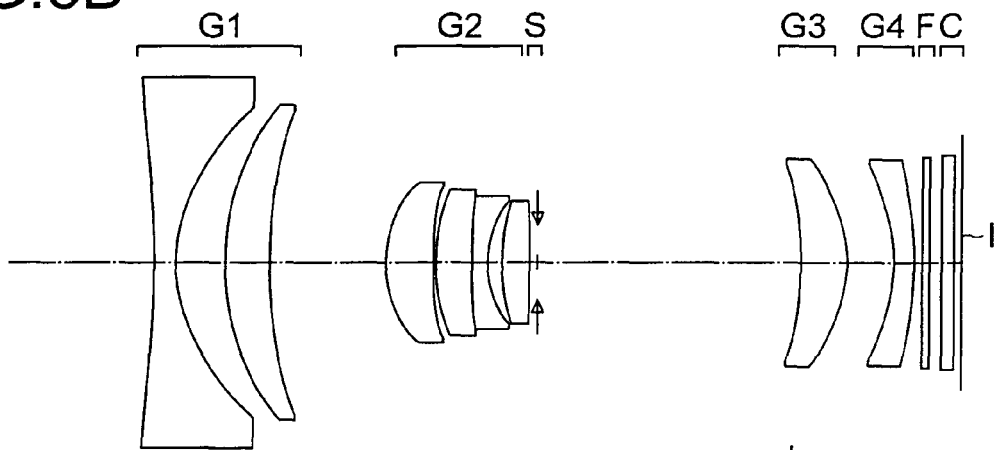
Figure 3C:
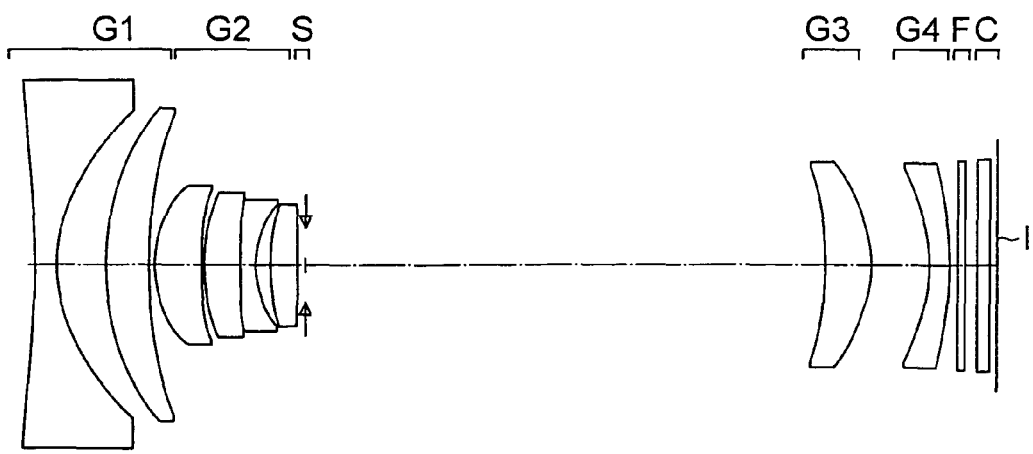

A zoom lens system in the third embodiment, as shown in FIG. 3A, FIG. 3B, and FIG. 3C, includes in order from the object side, a first lens unit G1 having a negative refracting power, a second lens unit G2 having a positive refracting power, an aperture stop S, a third lens unit G3 having a positive refracting power, and a fourth lens unit G4 having a negative refracting power.

At the time of zooming from the wide angle end to the telephoto end, the first lens unit G1, after moving toward the image side, moves toward the object side, the second lens unit G2 moves toward the object side, the third lens unit G3, after moving toward the image side, moves toward the object side. The fourth lens unit G4 is fixed.

In order from the object side, the first lens unit G1 includes a biconcave negative lens and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a biconvex positive lens. The third lens unit G3 includes a positive meniscus lens having a convex surface directed toward the image side. The fourth lens unit G4 includes a negative meniscus lens having a concave surface directed toward the object side.

An aspheric surface is provided to eight surfaces namely, both surfaces of the biconcave negative lens and a surface on the image side of the positive meniscus lens in the first lens unit G1, both surfaces of the positive meniscus lens on the object side in the second lens unit G2, both surfaces of the positive meniscus lens in the third lens unit G3, and a surface on the object side of the negative meniscus lens in the fourth lens unit G4.

Figure 4A:
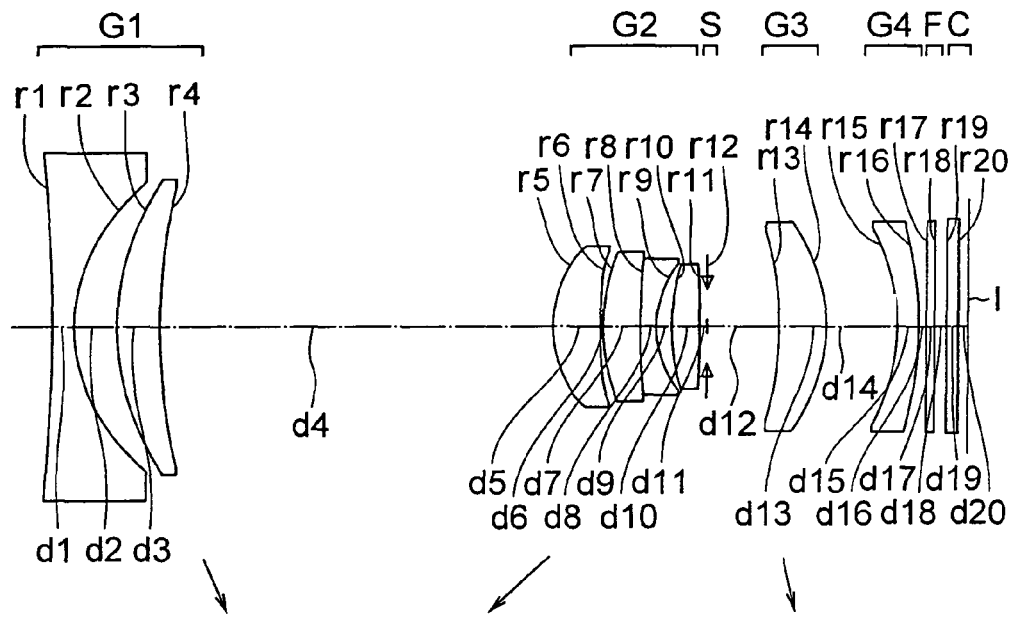
FIG. 4A, FIG. 4B, and FIG. 4C are diagrams similar to FIG. 1A, FIG. 1B, and FIG. 1C respectively, according to a fourth embodiment of the zoom lens system of the present invention.
Figure 4B:
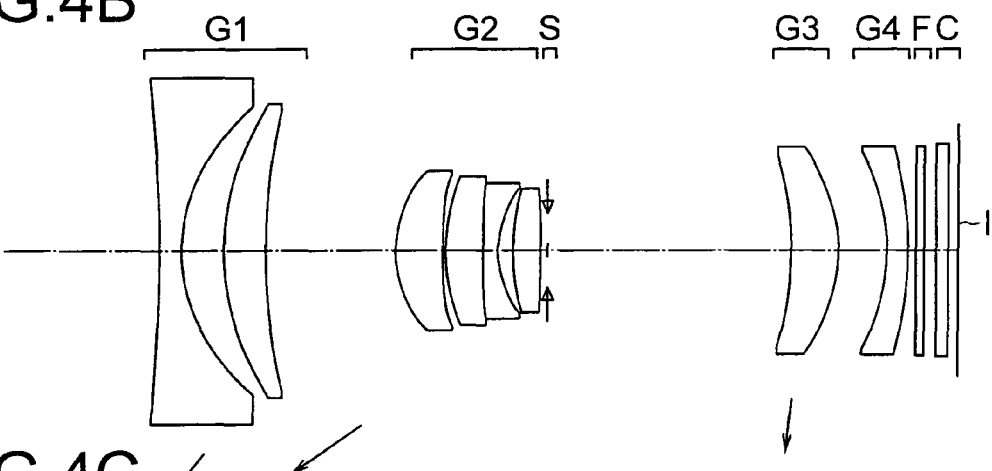
Figure 4C:
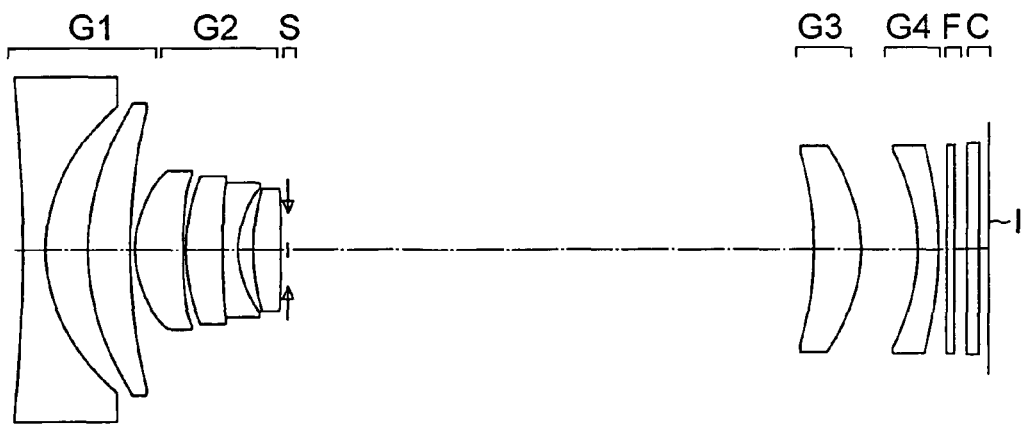

A zoom lens system in the fourth embodiment, as shown in FIG. 4A, FIG. 4B, and FIG. 4C, includes in order from the object side, a first lens unit G1 having a negative refracting power, a second lens unit G2 having a positive refracting power, an aperture stop S, a third lens unit G3 having a positive refracting power, and a fourth lens unit G4 having a negative refracting power.

At the time of zooming from the wide angle end to the telephoto end, the first lens unit G1, after moving toward the image side, moves toward the object side. The second lens unit G2 moves toward the object side. The third lens unit G3, after moving toward the image side, moves toward the object side. The fourth lens unit G4 is fixed.

In order from the object side, the first lens unit G1 includes a biconcave negative lens and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a biconvex lens. The third lens unit G3 includes a positive meniscus lens having a convex surface directed toward the image side. The fourth lens unit G4 includes a negative meniscus lens having a concave surface directed toward the object side.

An aspheric surface is provided to seven surfaces namely, both surfaces of the biconcave negative lens in the first lens unit G1, both surfaces of the positive meniscus lens on the object side in the second lens unit G2, both surfaces of the positive meniscus lens in the third lens unit G3, and a surface on the object side of the negative meniscus lens in the fourth lens unit.

Figure 5A:
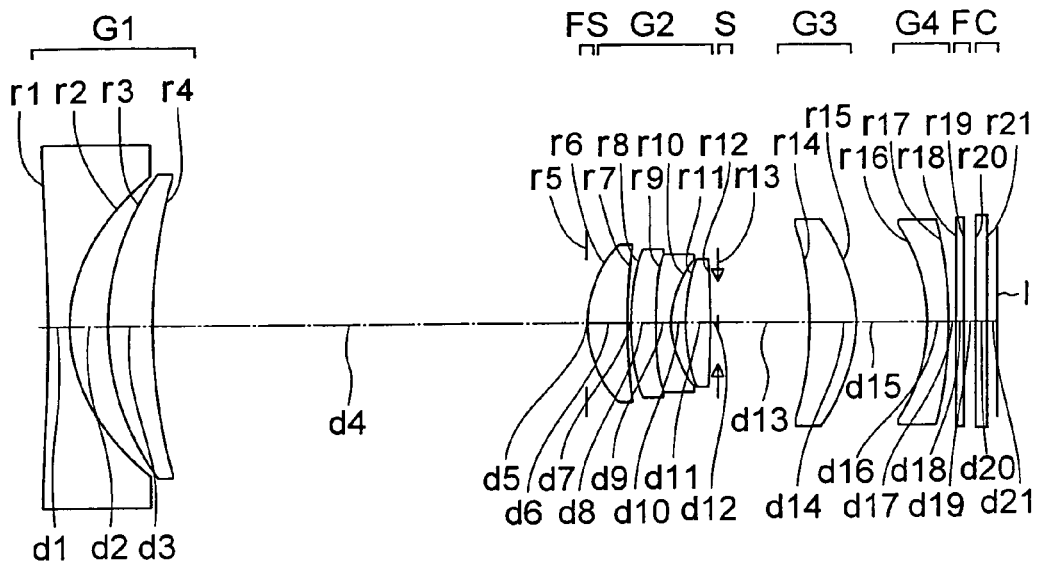
FIG. 5A, FIG. 5B, and FIG. 5C are diagrams similar to FIG. 1A, FIG. 1B, and FIG. 10 respectively, according to a fifth embodiment of the zoom lens system of the present invention.
Figure 5B:
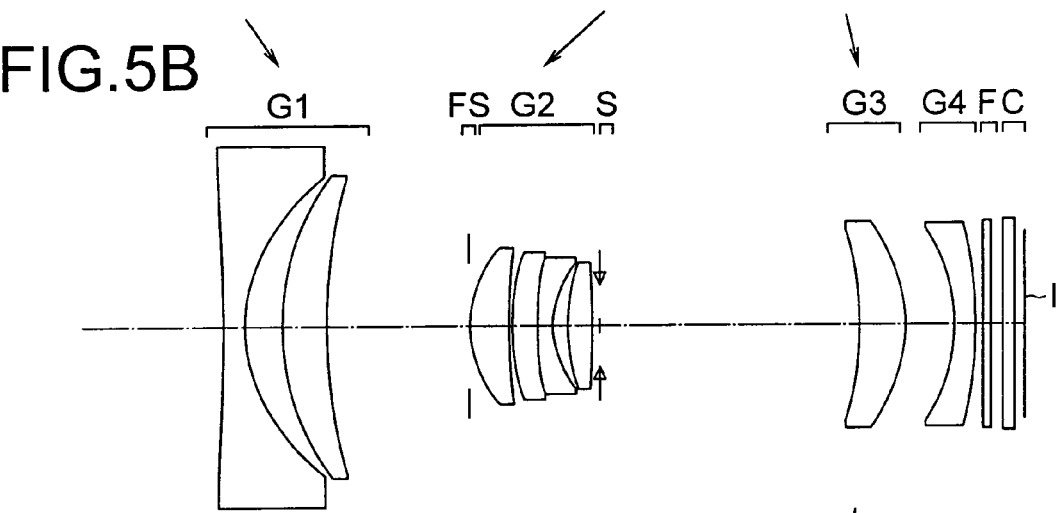
Figure 5C:
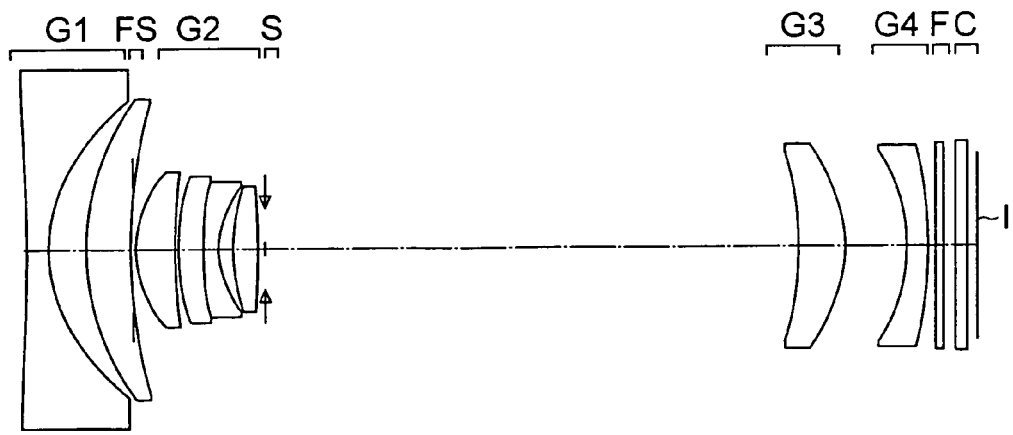

A zoom lens system in the fifth embodiment, as shown in FIG. 5A, FIG. 5B, and FIG. 5C, includes in order from the object side, a first lens unit G1 having a negative refracting power, a second lens unit G2 having a positive refracting power, an aperture stop S, a third lens unit G3 having a positive refracting power, and a fourth lens unit G4 having a negative refracting power.

At the time of zooming from the wide angle end to the telephoto end, the first lens unit G1, after moving toward the image side, moves toward the object side, the second lens unit G2 moves toward the object side, the third lens unit G3, after moving toward the image side, moves toward the object side. The fourth lens unit G4 is fixed.

In order from the object side, the first lens unit G1 includes a biconcave negative lens and a positive meniscus lens having a convex surface directed toward the object side. The second lens unit G2 includes a positive meniscus lens having a convex surface directed toward the image side, a cemented lens of a positive meniscus lens having a convex surface directed toward the object side and a negative meniscus lens having a convex surface directed toward the object side, and a biconvex positive lens. The third lens unit G3 includes a positive meniscus lens having a convex surface directed toward the image side. The fourth lens unit G4 includes a negative meniscus lens having a concave surface directed toward the object side. A flare aperture FS is provided between the first lens unit G1 and the second lens unit G2.

An aspheric surface is provided to eight surfaces namely, both surfaces of the biconcave negative lens and a surface on the image side of the positive meniscus lens in the first lens unit G1, both surfaces of the positive meniscus lens on the object side of the second lens unit G2, both surfaces of the positive meniscus lens in the third lens unit G3, and a surface on the object side of the negative meniscus lens in the fourth lens unit G4.

Figure 6A:
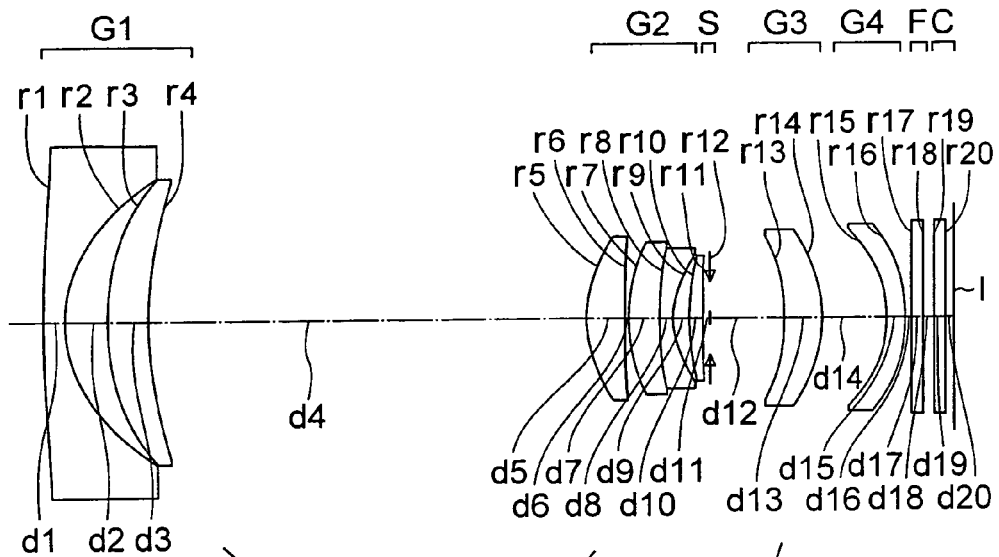
FIG. 6A, FIG. 6B, and FIG. 6C are diagrams similar to FIG. 1A, FIG. 1B, and FIG. 1C respectively, according to a sixth embodiment of the zoom lens system of the present invention.
Figure 6B:
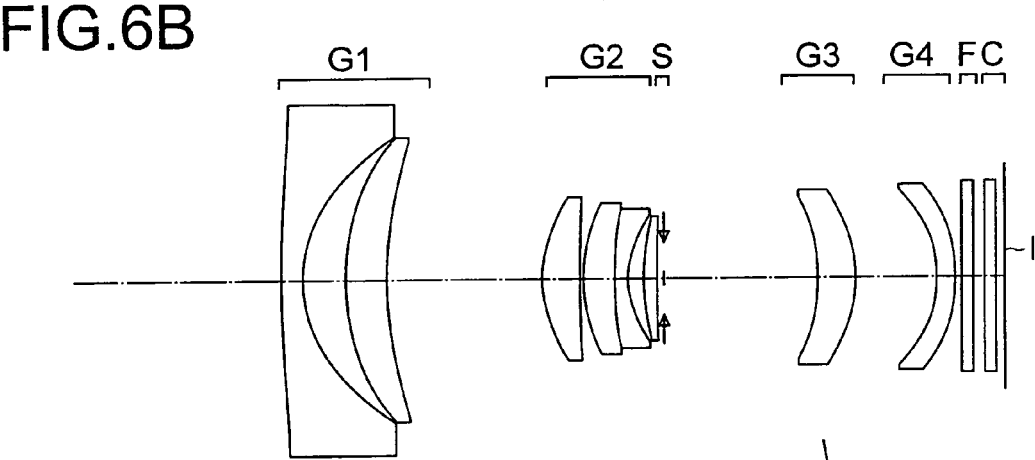
Figure 6C:
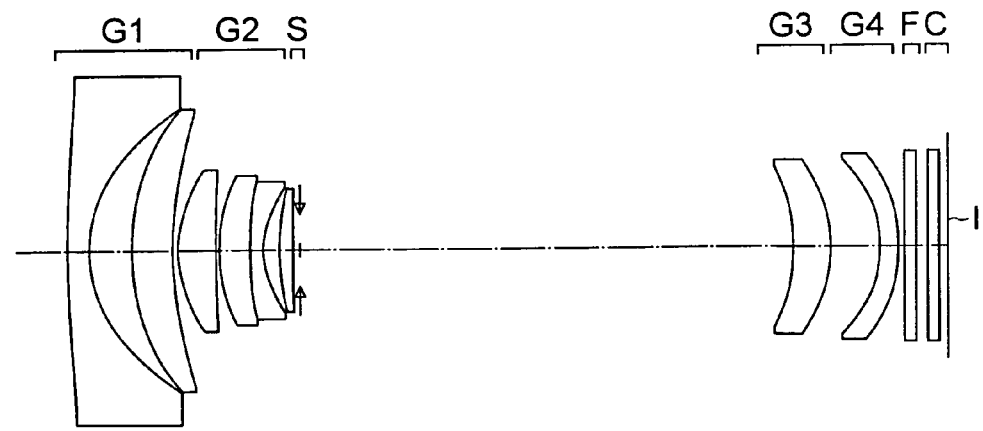
Figure 7A:
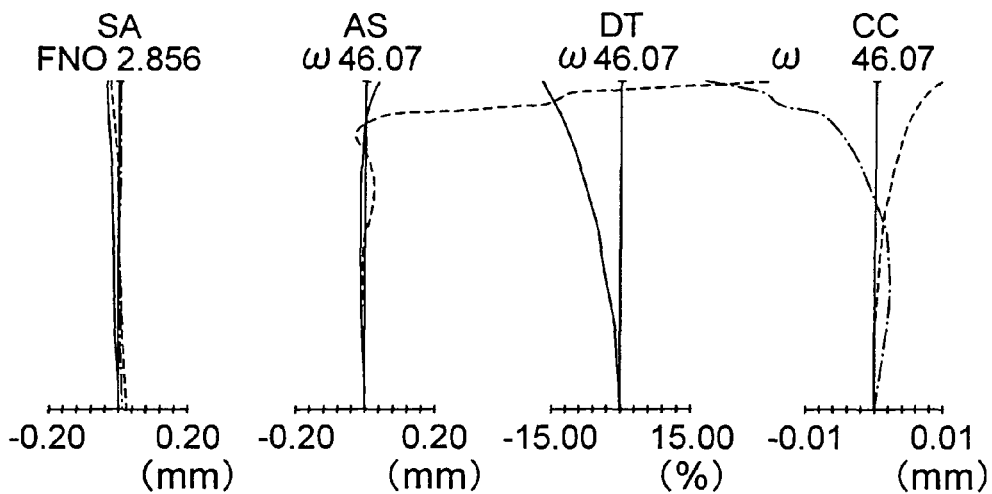
FIG. 7A, FIG. 7B, and FIG. 7C are aberration diagrams at the time of infinite object point focusing of the first embodiment.
Figure 7B:
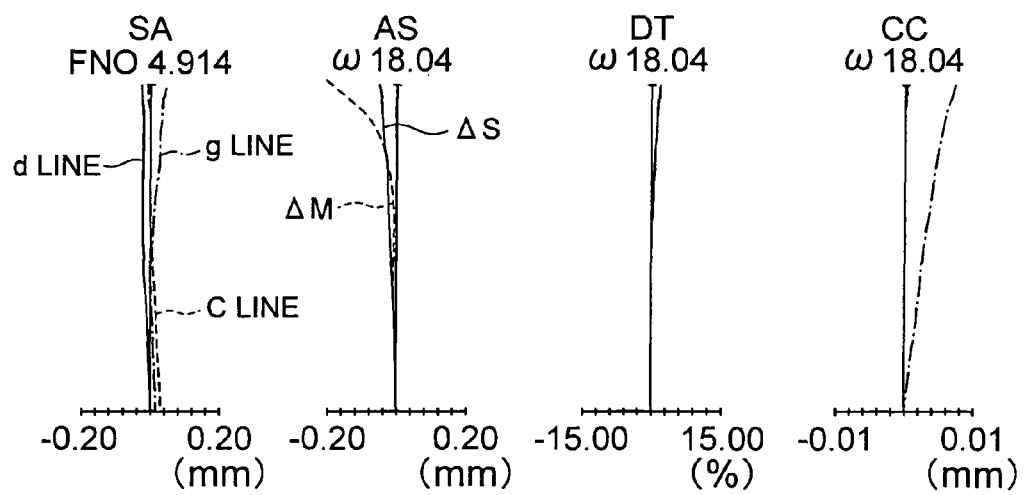
Figure 7C:
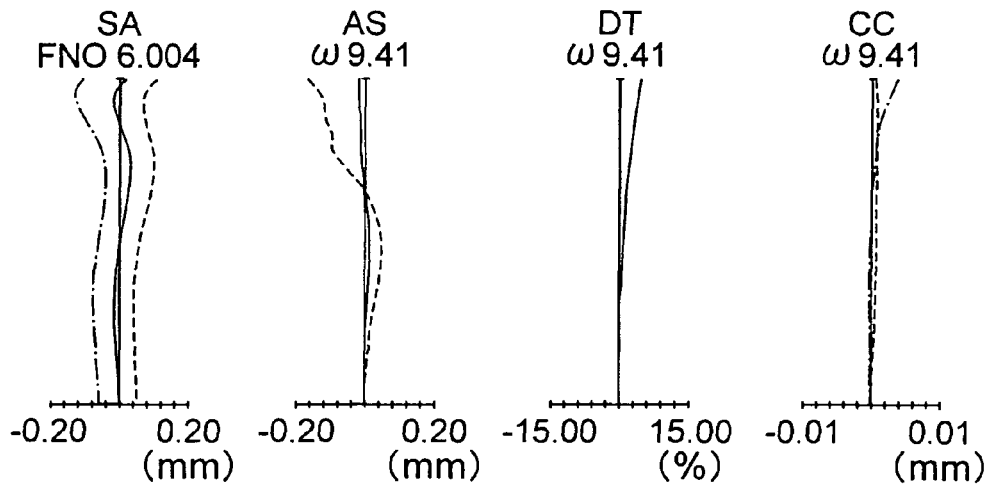
Figure 8A:
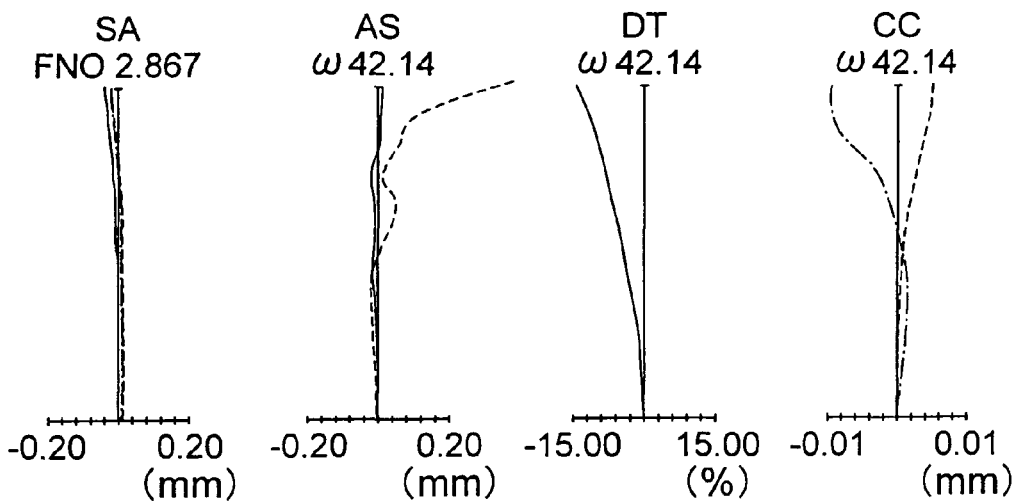
FIG. 8A, FIG. 8B, and FIG. 8C are aberration diagrams at the time of infinite object point focusing of the second embodiment.
Figure 8B:
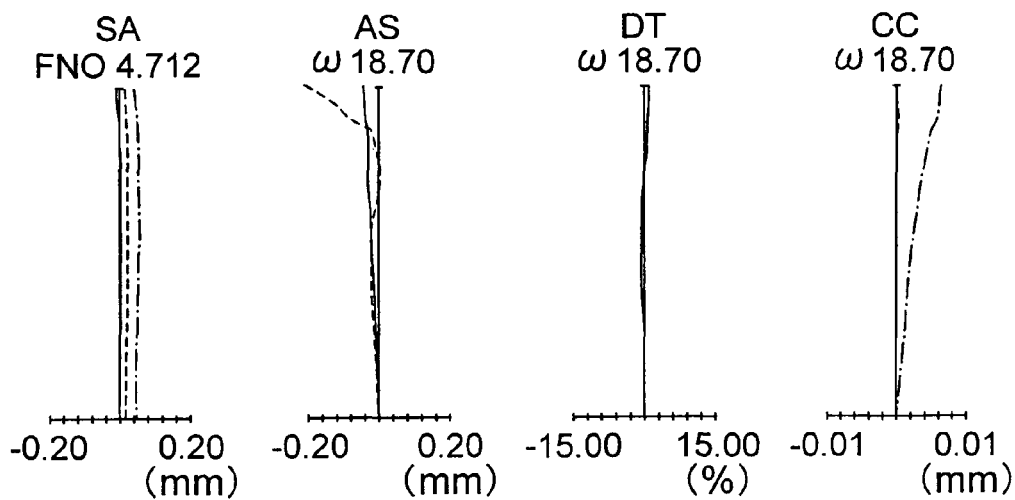
Figure 8C:
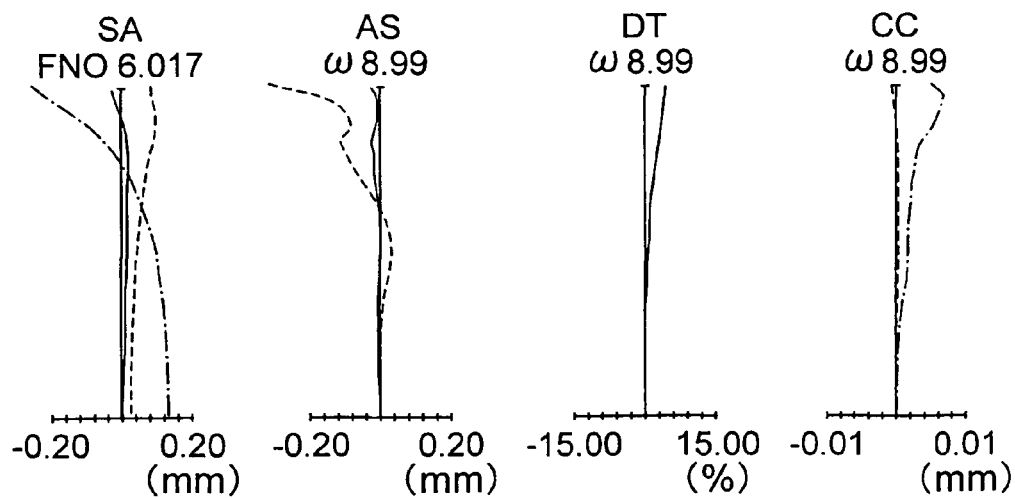
Figure 9A:
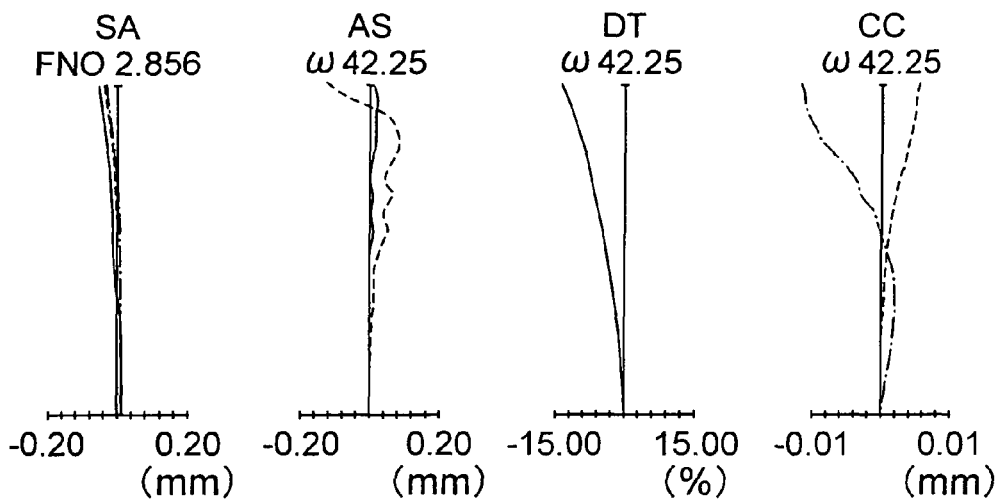
FIG. 9A, FIG. 9B, and FIG. 9C are aberration diagrams at the time of infinite object point focusing of the third embodiment.
Figure 9B:
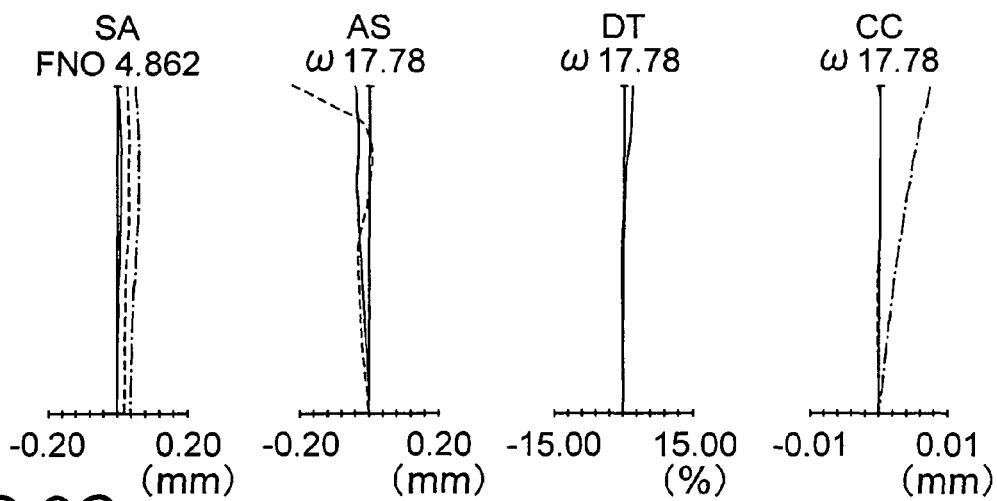
Figure 9C:
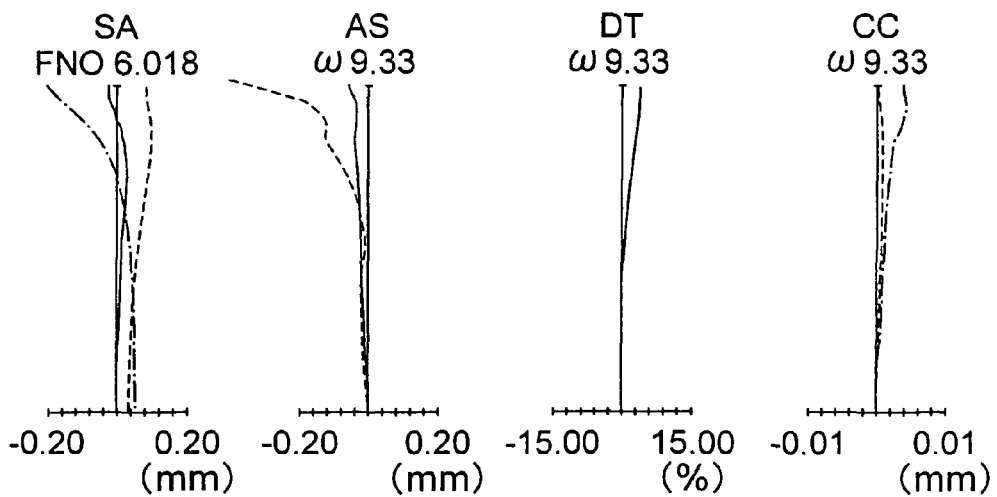
Figure 11A:
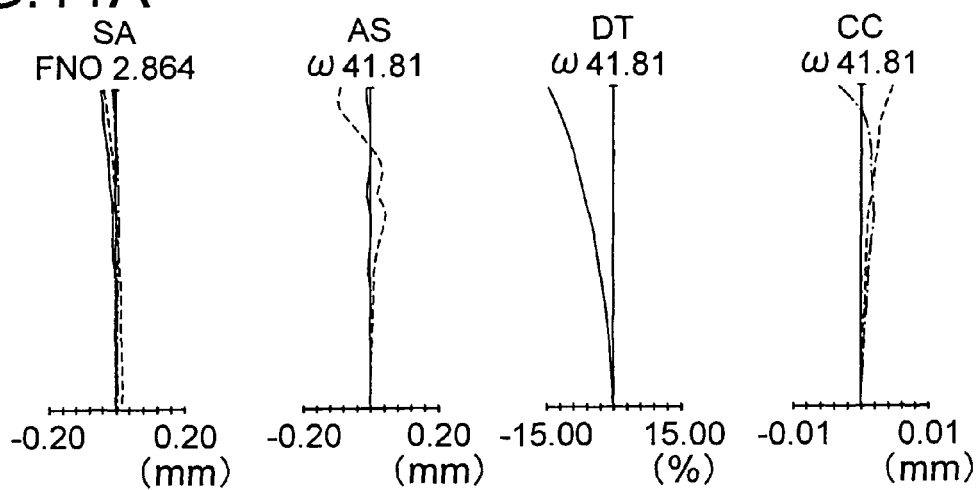
FIG. 11A, FIG. 11B, and FIG. 11C are aberration diagrams at the time of infinite object point focusing of the fifth embodiment.
Figure 11B:
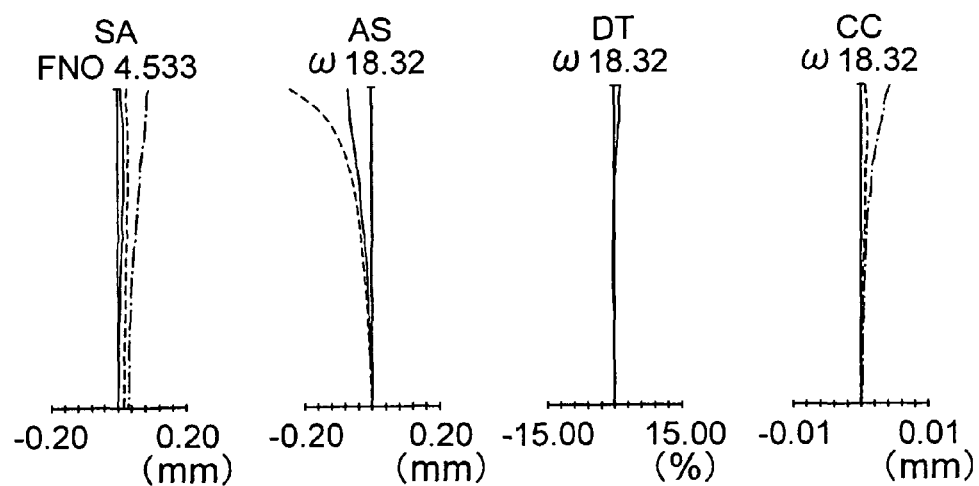
Figure 11C:
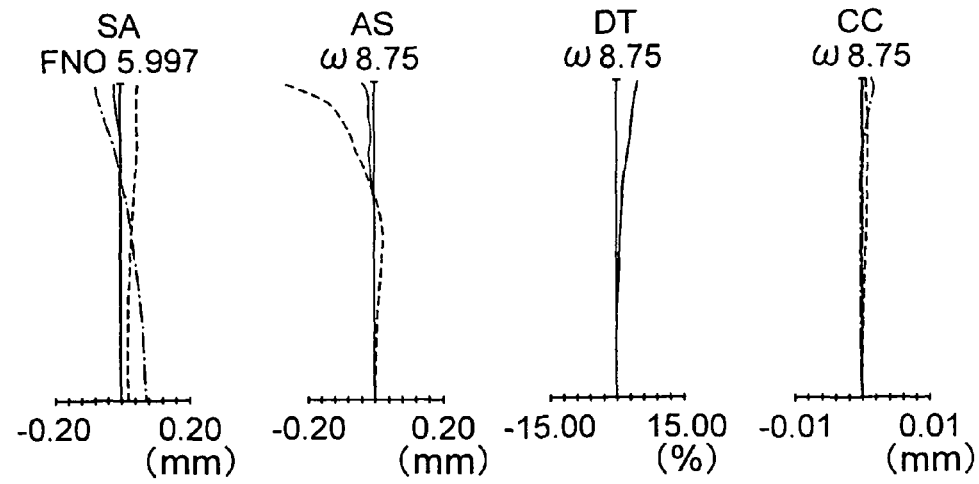
Figure 12A:
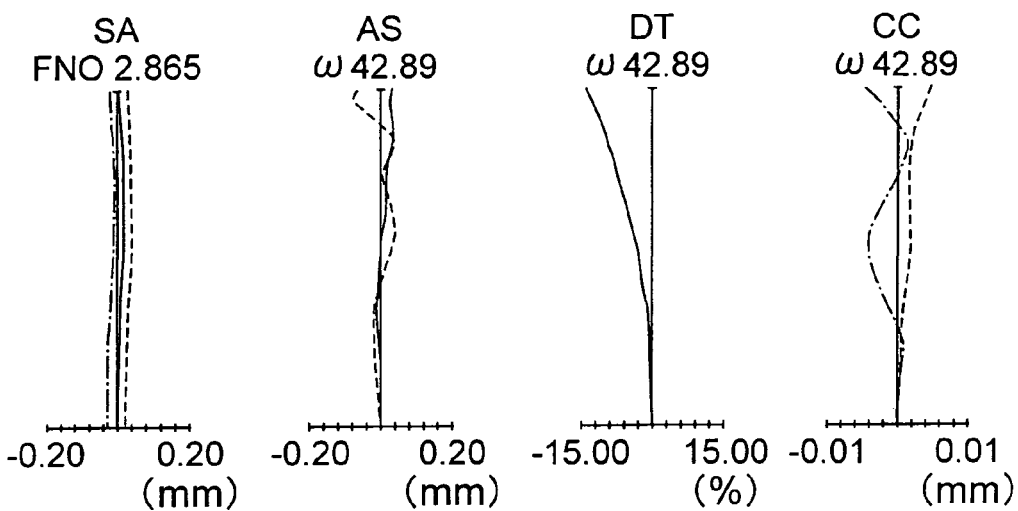
FIG. 12A, FIG. 12B, and FIG. 12C are aberration diagrams at the time of infinite object point focusing of the sixth embodiment.
Figure 12B:
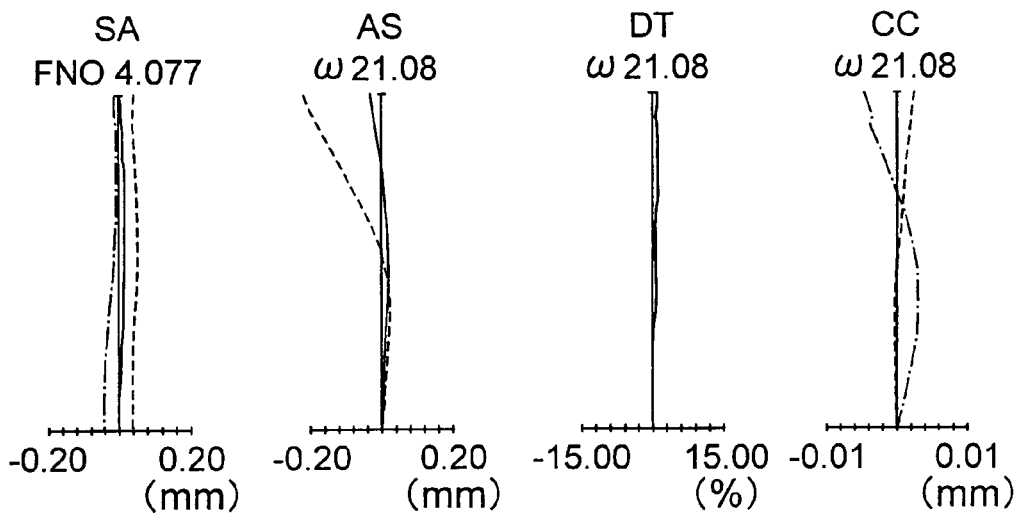
Figure 12C:
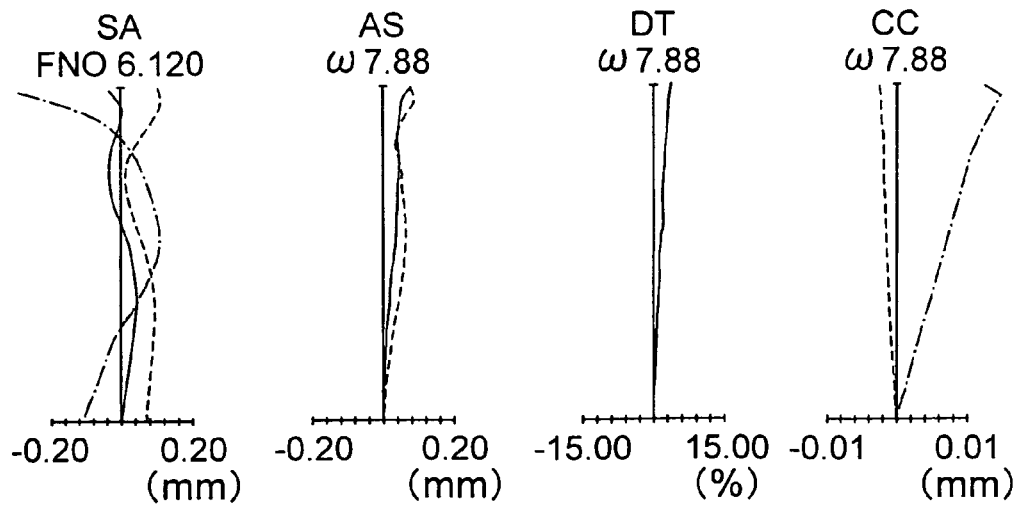

A zoom lens system in the sixth embodiment, as shown in FIG. 6A, FIG. 6B, and FIG. 6C, includes in order from the object side, a first lens unit G1 having a negative refracting power G1, a second lens unit G2 having a positive refracting power, an aperture stop S, a third lens unit G3 having a positive refracting power, and a fourth lens unit G4 having a negative refracting power.

At the time of zooming from the wide angle end to the telephoto end, the first lens unit G1, after moving toward the image side, moves toward the object side. The second lens unit G2 moves toward the object side. The third lens unit G3, after moving toward the image side, moves toward the object side. The fourth lens unit G4 is fixed.

In order from the object side, the first lens unit G1 includes a biconcave negative lens and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a biconvex positive lens. The third lens unit G3 includes a positive meniscus lens having a convex surface directed toward the image side. The fourth lens unit G4 includes a negative meniscus lens having a concave surface directed toward the object side.

An aspheric surface is provided to ten surfaces namely, both surfaces of the biconcave negative lens and both surfaces of the positive meniscus lens in the first lens unit G1, both surfaces of the positive meniscus lens on the object side and a surface on the image side of the biconvex positive lens in the second lens unit G2, a surface on the image side of the positive meniscus lens in the third lens unit G3, and both surfaces of the negative meniscus lens in the fourth lens unit G4.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x = (y^2/r)/[1+\{1-(K+1)(y/r)^2\}^{1/2}] + A_4 y^4 + A_6 y^6 + A_8 y^8 + A_{10} y^{10} + A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "*" means that the surface is an aspheric surface, and "S" means that the surface is an aperture stop.

Example 1

Unit mm

Surface data

| Surface no. | r | d | nd | vd |
|---|---|---|---|---|
| object plane | ∞ | ∞ | | |
| 1* | −47.643 | 0.85 | 1.85135 | 40.10 |
| 2* | 6.135 | 1.68 | | |
| 3 | 10.167 | 1.80 | 2.00178 | 19.30 |
| 4 | 22.997 | Variable | | |
| 5* | 4.840 | 1.80 | 1.58313 | 59.38 |
| 6* | 11.243 | 0.10 | | |
| 7 | 6.567 | 1.20 | 1.88300 | 40.76 |
| 8 | 16.755 | 0.60 | 1.92286 | 20.88 |
| 9 | 4.166 | 0.50 | | |
| 10 | 10.589 | 1.00 | 1.67270 | 32.10 |
| 11 | −23.507 | 0.50 | | |
| 12 (S) | ∞ | Variable | | |
| 13* | −16.664 | 1.70 | 1.55332 | 71.68 |
| 14* | −7.149 | Variable | | |
| 15* | −9.621 | 0.85 | 1.52540 | 56.25 |
| 16 | −17.144 | 0.30 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical Surface Data
1st Surface
k=0.000
A4=3.57128e−04, A=−6.63505e−06, A8=2.50508e−08, A10=3.08729e−10
2nd Surface
k=0.000
A4=−5.36474e−07, A6=−8.93302e−06, A8=−1.17768e−07, A10=−9.55808e−09
5th Surface
k=0.000
A4=−8.47352e−05, A6=3.01885e−06, A8=2.88087e−06
6th Surface
k=0.000
A4=8.80509e−04, A6=5.47311e−05, A8=2.98587e−07, A10=4.79526e−07
13th Surface
k=0.000
A4=−1.00016e−03, A6=−8.62351e−05, A8=8.90710e−06, A10=−8.22775e−08
14th Surface
k=0.000
A4=−2.69125e−04, A6=−7.45922e−05, A8=4.54677e−06, A10=6.88885e−08
15th Surface
k=0.000
A4=5.28228e−04, A6=−1.24484e−04, A8=5.07560e−06

Zoom data

| | WE | ST | TE |
|---|---|---|---|
| f (mm) | 4.63 | 11.55 | 22.16 |
| Fno. | 2.86 | 4.91 | 6.00 |
| 2ω (°) | 92.15 | 36.08 | 18.82 |
| d4 | 16.21 | 4.56 | 0.20 |
| d12 | 2.90 | 10.89 | 20.93 |
| d14 | 3.03 | 1.95 | 2.85 |
| fb | 1.70 | 1.70 | 1.70 |
| Lens total length | 36.42 | 31.69 | 38.26 |
| IH | 3.83 | 3.83 | 3.83 |

Unit focal length

| f1 = −11.23 | f2 = 9.81 | f3 = 21.27 | f4 = −43.42 |
|---|---|---|---|

Example 2

Unit mm

Surface data

| Surface no. | r | d | nd | vd |
|---|---|---|---|---|
| object plane | ∞ | ∞ | | |
| 1* | −29.322 | 0.85 | 1.85135 | 40.10 |
| 2* | 7.203 | 1.71 | | |
| 3 | 11.177 | 1.68 | 2.00178 | 19.30 |
| 4 | 25.650 | Variable | | |
| 5* | 5.019 | 1.85 | 1.58313 | 59.38 |
| 6* | 26.956 | 0.10 | | |
| 7 | 8.399 | 1.52 | 1.88300 | 40.76 |
| 8 | 32.055 | 0.60 | 1.84666 | 23.78 |
| 9 | 4.170 | 0.60 | | |
| 10 | 9.972 | 1.13 | 1.65412 | 39.68 |
| 11 | −63.359 | 0.30 | | |
| 12 (S) | ∞ | Variable | | |
| 13* | −15.933 | 1.89 | 1.55332 | 71.68 |
| 14* | −6.470 | Variable | | |
| 15* | −7.637 | 0.85 | 1.52540 | 56.25 |
| 16 | −15.470 | 0.30 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical Surface Data
1st Surface
k=0.000
A4=4.99109e−04, A6=−8.94706e−06, A8=1.00727e−07, A10=−7.91343e−10
2nd Surface
k=0.000
A4=2.61070e−04, A6=−5.93572e−06, A8=7.91557e−08, A10=−6.87609e−09
5th Surface
k=0.000
A4=−2.51325e−05, A6=−7.06371e−06, A8=7.37768e−06
6th Surface
k=0.000
A4=9.96217e−04, A6=2.63226e−06, A8=1.36408e−05, A10=−4.27886e−10
13th Surface
k=0.000
A4=−5.04802e−04, A6=−1.76423e−04, A8=1.60553e−05, A10=−2.50741e−07
14th Surface
k=0.000
A4=5.55538e−04, A6=−1.72511e−04, A8=1.01417e−05, A10=4.95291e−09

15th Surface
k=0.000
A4=1.83506e−03, A6=−2.90323e−04, A8=1.26326e−05

| Zoom data | | | |
|---|---|---|---|
| | WE | ST | TE |
| f (mm) | 4.95 | 11.19 | 23.33 |
| Fno. | 2.87 | 4.71 | 6.02 |
| 2ω (°) | 84.29 | 37.40 | 17.99 |
| d4 | 15.65 | 5.19 | 0.20 |
| d12 | 2.84 | 9.80 | 21.06 |
| d14 | 2.80 | 1.85 | 2.32 |
| fb | 1.70 | 1.70 | 1.70 |
| Lens total length | 36.06 | 31.61 | 38.35 |
| IH | 3.83 | 3.83 | 3.83 |

| Unit focal length | | | |
|---|---|---|---|
| f1 = −11.64 | f2 = 9.84 | f3 = 18.38 | f4 = −29.83 |

Example 3

Unit mm

| Surface data | | | |
|---|---|---|---|
| Surface no. | r | d | nd | vd |
| object plane | ∞ | ∞ | | |
| 1* | −29.659 | 0.85 | 1.85135 | 40.10 |
| 2* | 7.252 | 1.94 | | |
| 3 | 10.470 | 1.75 | 2.00178 | 19.30 |
| 4* | 21.675 | Variable | | |
| 5* | 4.836 | 1.88 | 1.58313 | 59.38 |
| 6* | 27.362 | 0.10 | | |
| 7 | 8.675 | 1.44 | 1.88300 | 40.76 |
| 8 | 27.723 | 0.60 | 1.84666 | 23.78 |
| 9 | 4.076 | 0.60 | | |
| 10 | 9.821 | 1.09 | 1.65412 | 39.68 |
| 11 | −75.537 | 0.30 | | |
| 12 (S) | ∞ | Variable | | |
| 13* | −16.273 | 1.83 | 1.55332 | 71.68 |
| 14* | −6.109 | Variable | | |
| 15* | −7.355 | 0.85 | 1.52540 | 56.25 |
| 16 | −15.794 | 0.30 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical Surface Data
1st Surface
k=0.000
A4=3.40995e−04, A6=−5.13343e−06, A8=3.35710e−08
2nd Surface
k=0.000
A4=−3.33261e−05, A6=−5.81602e−06, A8=−6.03232e−08,
4th Surface
k=0.000
A4=9.48874e−05, A6=1.76986e−06, A8=−4.31922e−08
5th Surface
k=0.000
A4=−1.44419e−04, A6=−5.59810e−07, A8=7.06727e−06
6th Surface
k=0.000
A4=9.35523e−04, A6=2.05726e−05, A8=1.32121e−05
13th Surface
k=0.000
A4=7.29618e−05, A6=−1.48545e−04, A8=7.20359e−06, A10=1.15579e−10
14th Surface
k=0.000
A4=1.45067e−03, A6=−1.84082e−04, A8=6.92278e−06, A10=4.71448e−08
15th Surface
k=0.000
A4=2.66399e−03, A6=−3.80171e−04, A8=1.55021e−05

| Zoom data | | | |
|---|---|---|---|
| | WE | ST | TE |
| f (mm) | 4.86 | 11.73 | 22.48 |
| Fno. | 2.86 | 4.86 | 6.02 |
| 2ω (°) | 84.50 | 35.56 | 18.66 |
| d4 | 16.14 | 4.68 | 0.20 |
| d12 | 3.04 | 10.58 | 20.84 |
| d14 | 2.66 | 1.87 | 2.35 |
| fb | 1.70 | 1.70 | 1.70 |
| Lens total length | 36.77 | 32.06 | 38.32 |
| IH | 3.83 | 3.83 | 3.83 |

| Unit focal length | | | |
|---|---|---|---|
| f1 = −11.86 | f2 = 10.04 | f3 = 16.61 | f4 = −27.14 |

Example 4

Unit mm

Surface Data

| Surface no. | r | d | nd | vd |
|---|---|---|---|---|
| object plane | ∞ | ∞ | | |
| 1* | −29.770 | 0.85 | 1.85135 | 40.10 |
| 2* | 7.223 | 1.69 | | |
| 3 | 11.193 | 1.67 | 2.00178 | 19.30 |
| 4 | 25.783 | Variable | | |
| 5* | 5.028 | 1.88 | 1.58313 | 59.38 |
| 6* | 26.919 | 0.10 | | |
| 7 | 8.396 | 1.48 | 1.88300 | 40.76 |
| 8 | 32.017 | 0.60 | 1.84666 | 23.78 |
| 9 | 4.168 | 0.60 | | |
| 10 | 9.935 | 1.09 | 1.65412 | 39.68 |
| 11 | −61.878 | 0.30 | | |
| 12 (S) | ∞ | Variable | | |
| 13* | −15.998 | 1.90 | 1.55332 | 71.68 |
| 14* | −6.455 | Variable | | |
| 15* | −7.654 | 0.85 | 1.52540 | 56.25 |
| 16 | −15.418 | 0.30 | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical Surface Data
1st Surface
k=0.000
A4=5.79963e−04, A6=−1.48583e−05, A8=2.04528e−07, A10=−1.26564e−09

2nd Surface
k=0.000
A4=3.39406e−04, A6=−1.07046e−05, A8=−1.11476e−07, A10=1.68906e−10
5th Surface
k=0.000
A4=−1.26615e−04, A6=−1.07869e−05, A8=6.13180e−06
6th Surface
k=0.000
A4=8.19692e−04, A6=4.53322e−06, A8=1.05330e−05, A10=3.19520e−08
13th Surface
k=0.000
A4=−2.57078e−04, A6=−1.48954e−04, A8=1.07509e−05, A10=−8.21444e−08
14th Surface
k=0.000
A4=9.62948e−04, A6=−1.55832e−04, A8=6.49494e−06, A10=8.75571e−08
15th Surface
k=0.000
A4=2.48017e−03, A6=−3.09823e−04, A8=1.14834e−05

| Zoom data | | | |
|---|---|---|---|
| | WE | ST | TE |
| f (mm) | 4.97 | 11.14 | 23.29 |
| Fno. | 2.86 | 4.66 | 6.02 |
| 2ω (°) | 83.79 | 37.54 | 18.00 |
| d4 | 15.64 | 5.20 | 0.20 |
| d12 | 2.87 | 9.70 | 21.04 |
| d14 | 2.84 | 1.97 | 2.33 |
| fb | 1.70 | 1.70 | 1.70 |
| Lens total length | 36.05 | 31.58 | 38.28 |
| IH | 3.83 | 3.83 | 3.83 |

| Unit focal length | | | |
|---|---|---|---|
| f1 = −11.74 | f2 = 9.89 | f3 = 18.26 | f4 = −30.06 |

Example 5

Unit mm

| Surface data | | | | |
|---|---|---|---|---|
| Surface no. | r | d | nd | vd |
| object plane | ∞ | ∞ | | |
| 1* | −125.379 | 0.85 | 1.85135 | 40.10 |
| 2* | 6.533 | 1.53 | | |
| 3 | 10.567 | 1.76 | 2.00178 | 19.30 |
| 4* | 21.169 | Variable | | |
| 5 | ∞ | 0.00 | | |
| 6* | 4.591 | 1.60 | 1.58313 | 59.38 |
| 7* | 32.489 | 0.10 | | |
| 8 | 10.167 | 1.01 | 1.88300 | 40.76 |
| 9 | 14.013 | 0.60 | 1.84666 | 23.78 |
| 10 | 3.990 | 0.60 | | |
| 11 | 8.610 | 1.00 | 1.65475 | 38.56 |
| 12 | −35.265 | 0.30 | | |
| 13 (S) | ∞ | Variable | | |
| 14* | −14.600 | 1.81 | 1.55332 | 71.68 |
| 15* | −6.184 | Variable | | |
| 16* | −6.509 | 0.85 | 1.52540 | 56.25 |
| 17 | −16.639 | 0.30 | | |
| 18 | ∞ | 0.30 | 1.51633 | 64.14 |
| 19 | ∞ | 0.50 | | |
| 20 | ∞ | 0.50 | 1.51633 | 64.14 |
| 21 | ∞ | 0.37 | | |
| Image plane (Light receiving surface) | ∞ | | | |

Aspherical Surface Data

1st Surface
k=0.000
A4=1.62111e−04, A6=−6.07086e−06, A8=5.96970e−08
2nd Surface
k=0.000
A4=1.22310e−04, A6=−1.34058e−05, A8=−1.94237e−07
4th Surface
k=0.000
A4=−1.65315e−04, A6=3.77200e−06, A8=−3.58859e−08
6th Surface
k=0.000
A4=−5.94521e−04, A6=−1.58611e−05, A8=3.19594e−07
7th Surface
k=0.000
A4=2.30559e−04, A6=−3.27821e−06, A8=2.12462e−06
14th Surface
k=0.000
A4=6.53464e−05, A6=−1.31379e−04, A8=7.46808e−06, A10=−3.35062e−09
15th Surface
k=0.000
A4=1.36585e−03, A6=−1.67655e−04, A8=7.06557e−06, A10=3.48165e−08
16th Surface
k=0.000
A4=2.41340e−03, A6=−2.91695e−04, A8=1.12706e−05

| Zoom data (∞) | | | |
|---|---|---|---|
| | WE | ST | TE |
| f (mm) | 5.02 | 11.41 | 23.86 |
| Fno. | 2.86 | 4.53 | 6.00 |
| 2ω (°) | 83.62 | 36.65 | 17.50 |
| d4 | 17.29 | 5.69 | 0.20 |
| d13 | 3.64 | 10.39 | 21.35 |
| d15 | 2.88 | 1.99 | 2.53 |
| fb | 1.70 | 1.70 | 1.70 |
| Lens total length | 37.51 | 31.78 | 37.78 |
| IH | 3.83 | 3.83 | 3.83 |

| Unit focal length | | | |
|---|---|---|---|
| f1 = −12.37 | f2 = 10.13 | f3 = 18.01 | f4 = −20.95 |

Example 6

Unit mm

Surface data

| Surface no. | r | d | nd | vd |
|---|---|---|---|---|
| object plane | ∞ | ∞ | | |
| 1* | −75.513 | 0.85 | 1.85135 | 40.10 |
| 2* | 6.575 | 1.87 | | |
| 3* | 8.310 | 1.83 | 2.00178 | 19.30 |
| 4* | 13.070 | Variable | | |
| 5* | 5.923 | 1.72 | 1.58313 | 59.38 |
| 6* | 77.755 | 0.10 | | |
| 7 | 7.546 | 1.41 | 1.88300 | 40.76 |
| 8 | 17.737 | 0.60 | 1.84666 | 23.78 |
| 9 | 4.669 | 0.70 | | |
| 10 | 11.982 | 0.60 | 1.58313 | 59.38 |
| 11* | −263.242 | 0.30 | | |
| 12 (S) | ∞ | Variable | | |
| 13 | −8.490 | 1.69 | 1.58313 | 59.38 |
| 14* | −6.138 | Variable | | |
| 15* | −8.555 | 0.85 | 1.52540 | 56.25 |
| 16* | −15.738 | 0.30 | | |
| 17 | ∞ | 0.50 | 1.51633 | 64.14 |
| 18 | ∞ | 0.50 | | |
| 19 | ∞ | 0.50 | 1.51633 | 64.14 |
| 20 | ∞ | 0.37 | | |
| Image plane (Light receiving surface) | ∞ | | | |

Aspherical Surface Data
1st Surface
k=0.000
A4=6.33994e−04, A6=−1.09314e−05, A8=5.62486e−08
2nd Surface
k=0.000
A4=−6.33514e−04, A6=6.19211e−05, A8=−1.45182e−06
3rd Surface
k=0.000
A4=−1.56534e−03, A6=4.77192e−05, A8=−5.32958e−07
4th Surface
k=0.000
A4=−1.18060e−03, A6=3.31937e−05, A8=−3.42019e−07
5th Surface
k=0.000
A4=−3.80197e−04, A6=2.27438e−06, A8=−4.02765e−07
6th Surface
k=0.000
A4=−1.05596e−04, A6=5.81845e−06, A8=−5.19839e−07
11th Surface
k=0.000
A4=9.91845e−04, A6=3.99228e−06, A8=7.49200e−06
14th Surface
k=0.000
A4=3.97998e−04, A6=8.60846e−06, A8=4.07634e−07
15th Surface
k=0.000
A4=−6.69660e−03, A6=2.45830e−04
16th Surface
k=0.000
A4=−6.14930e−03, A6=1.93177e−04

Zoom data (∞)

| | WE | ST | TE |
|---|---|---|---|
| f (mm) | 4.79 | 9.85 | 26.72 |
| Fno. | 2.86 | 4.08 | 6.12 |
| 2ω (°) | 85.78 | 42.15 | 15.75 |
| d4 | 19.36 | 6.97 | 0.20 |
| d12 | 3.29 | 6.80 | 21.94 |
| d14 | 2.82 | 3.61 | 2.18 |
| fb | 1.83 | 1.83 | 1.83 |
| Lens total length | 39.81 | 31.71 | 38.65 |
| IH | 3.83 | 3.83 | 3.83 |

Unit focal length

| f1 = −11.78 | f2 = 9.71 | f3 = 30.06 | f4 = −37.19 |
|---|---|---|---|

Aberration diagrams at the time of infinite object point focusing in the embodiments from the first embodiment to the sixth embodiment are shown in diagrams from FIG. 7A to FIG. 12C. In these aberration diagrams, FIG. 7A, FIG. 8A, FIG. 9A, FIG. 10A, FIG. 11A, and FIG. 12A show spherical aberration (SA), an astigmatism (AS), a distortion (DT), and a chromatic aberration of magnification (CC) at the wide angle end, FIG. 7B, FIG. 8B, FIG. 9B, FIG. 10B, FIG. 11B, and FIG. 12B show spherical aberration (SA), an astigmatism (AS), a distortion (DT), and a chromatic aberration of magnification (CC) in the intermediate state, and FIG. 7C, FIG. 8C, FIG. 9C, FIG. 10C, FIG. 11C, and FIG. 12C show spherical aberration (SA), an astigmatism (AS), a distortion (DT), and a chromatic aberration of magnification (CC) at the telephoto end. In these diagrams, ω denotes a half image angle.

Next, values in the conditional expressions from (1A) to (6A), and the conditional expressions from (1B) to (6B) are given below. With regard to a correction of distortion, there is no change in the abovementioned values for the intermediate state and (the state at) the telephoto end. Therefore, repeated values are omitted.

| | Ex. 1 | Ex. 2 | Ex. 3 | Ex. 4 | Ex. 5 | Ex. 6 |
|---|---|---|---|---|---|---|
| (1A) $(R_{4a} + R_{4b})/(R_{4a} − R_{4b})$ | −3.56 | −2.95 | −2.74 | −2.97 | −2.28 | −3.38 |
| (2A) $D_T/f_t$ | 1.74 | 1.66 | 1.72 | 1.66 | 1.60 | 1.46 |
| (3A) $(R_{1a} + R_{1b})/(R_{1a} − R_{1b})$ | 0.77 | 0.61 | 0.61 | 0.61 | 0.90 | 0.84 |
| (4A) $N_1$ | 1.85135 | 1.85135 | 1.85135 | 1.85135 | 1.85135 | 1.85135 |
| (5A) $N_2$ | 2.00178 | 2.00178 | 2.00178 | 2.00178 | 2.00178 | 2.00178 |
| (6A) ft/fw | 4.79 | 4.72 | 4.62 | 4.68 | 4.76 | 5.58 |
| Image Height after electrical correction of distortion (wide angle end) | 3.39 | 3.42 | 3.41 | 3.42 | 3.41 | 3.43 |
| Total image angle after electrical correction of distortion (wide angle end) | 79.26 | 75.49 | 76.46 | 75.23 | 74.73 | 77.31 |

|  | Ex. 1 | Ex. 2 | Ex. 3 | Ex. 4 | Ex. 5 | Ex. 6 |
|---|---|---|---|---|---|---|
| (1B) $(R_{4a} + R_{4b})/(R_{4a} - R_{4b})$ | −3.56 | −2.95 | −2.74 | −2.97 | −2.28 | −3.38 |
| (2B) $D_T/f_t$ | 1.74 | 1.66 | 1.72 | 1.66 | 1.60 | 1.46 |
| (3B) $(R_{1a} + R_{1b})/(R_{1a} - R_{1b})$ | 0.77 | 0.61 | 0.61 | 0.61 | 0.90 | 0.84 |
| (4B) $N_1$ | 1.85135 | 1.85135 | 1.85135 | 1.85135 | 1.85135 | 1.85135 |
| (5B) $N_2$ | 2.00178 | 2.00178 | 2.00178 | 2.00178 | 2.00178 | 2.00178 |
| (6B) ft/fw | 4.79 | 4.72 | 4.62 | 4.68 | 4.76 | 5.58 |
| Image Height after electrical correction of distortion (wide angle end) | 3.39 | 3.42 | 3.41 | 3.42 | 3.41 | 3.43 |
| Total image angle after electrical correction of distortion (wide angle end) | 79.26 | 75.49 | 76.46 | 75.23 | 74.73 | 77.31 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Signal Processing of Distortion)

In the zoom lenses according to the embodiments, barrel distortion occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

In the embodiments, the effective image pickup area is designed in such a way that the effective image pickup area at the wide angle end has a dimension in the shorter side direction equal to the dimension in the shorter side direction of the photoelectric conversion surface, and a distortion of approximately −3% remains after image processing. As a matter of course, a barrel shaped area smaller than that described above may be set as the effective image pickup area, and image resulting from transformation of this area into a rectangular area may be recorded/reproduced.

(Signal Processing for Correction of Chromatic Aberration of Magnification)

In electronic still cameras, an image of an object is generally separated into images of three primary colors or first, second, and third primary colors, and a color image is reproduced by superimposing the output signals of the respective colors by computation. In a case where the zoom lens has chromatic aberration of magnification, if the image with the first primary color light is taken as a reference, the positions at which the images with the second primary color light and the third primary color light are formed will be displaced from the position at which the image with the first primary color light is formed.

In order to electrically correct chromatic aberration of magnification of an image, the amounts of displacement of the image positions with the second primary color light and the third primary color light relative to the image position with the first primary color light are obtained in advance for each pixel of the image pickup element based on information on the aberration of the zoom lens. Then, coordinate transformation may be performed for each pixel of a picked up image in such a way that the displacement relative to the image position with the first primary color light is corrected. In a case, for example, where an image is composed of three primary color output signals of red (R), green (G), and blue (B), displacements in the R and B image positions from the G image position may be obtained for each pixel in advance, and coordinate transformation may be performed on the picked up image to correct or eliminate displacement from the G image position, and R and B signals after correction may be output.

Since chromatic aberration of magnification changes depending on the zoom position, the focus position, and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the lens position. Thus, the second and third primary color signals that have been corrected in terms of displacement relative to the first primary color signal can be output.

Further, each of the embodiments is the zoom lens system which has a wide angle at wide angle end and is small and has a high zooming ratios and has a good optical performance.

(Correction of Distortion)

Incidentally, when the zoom lens system of the present invention is used, a digital correction of distortion of an image is carried out electrically. A basic concept for the digital correction of the distortion of an image will be described below.

Figure 13:
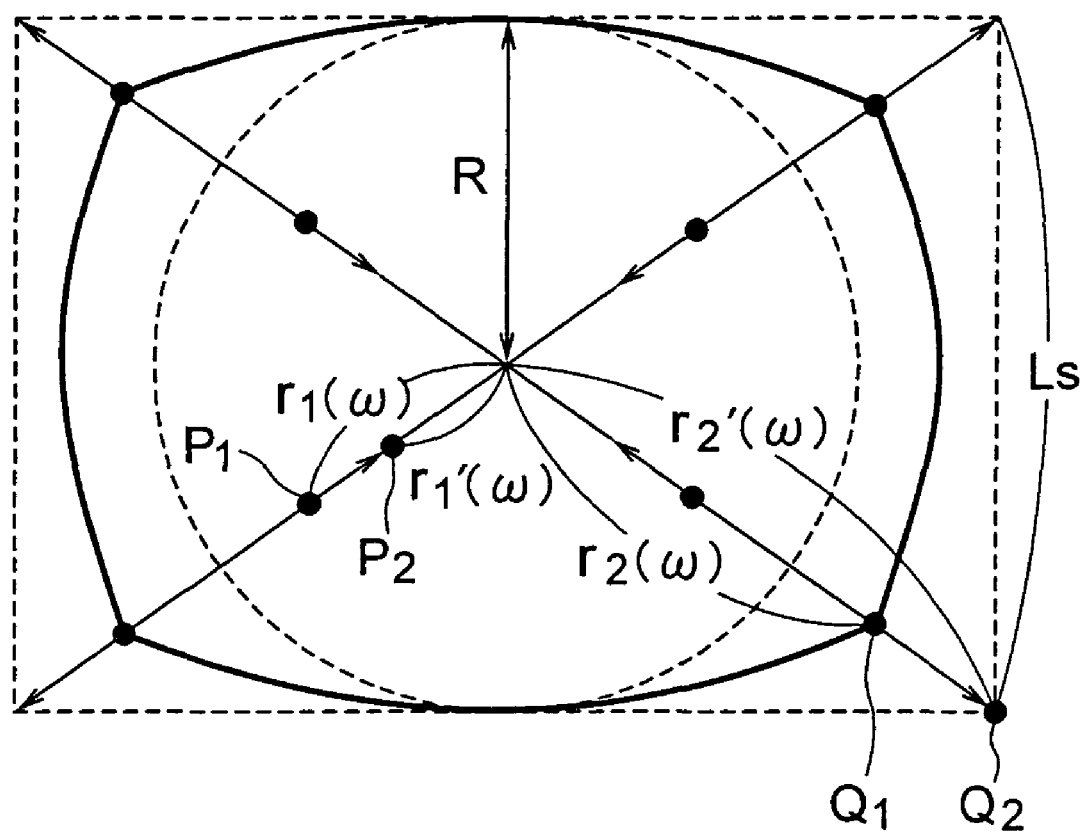
FIG. 13 is a diagram describing a correction of a distortion.

For example, as shown in FIG. 13, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 13, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \, (0 \leq \alpha \leq 1)$$

where, $\omega$ is a half image angle of an object and $f$ is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan \omega$$

holds.

Here, y denotes a height (image height) of an image point from the optical axis, f denotes a focal length of an imaging system (zoom lens system in the present invention), and w denotes an angle (object half image angle) with respect to the optical axis in an object point direction corresponding to image points connecting from a center on an image pickup plane up to a position of y.

When there is a barrel-shape distortion in the imaging system, the relationship becomes $$f>y/\tan \omega.$$

In other words, when the focal length f of the imaging system, and the image height y are let to be fixed, a value of ω becomes large.

(Digital Camera)

Figure 14:
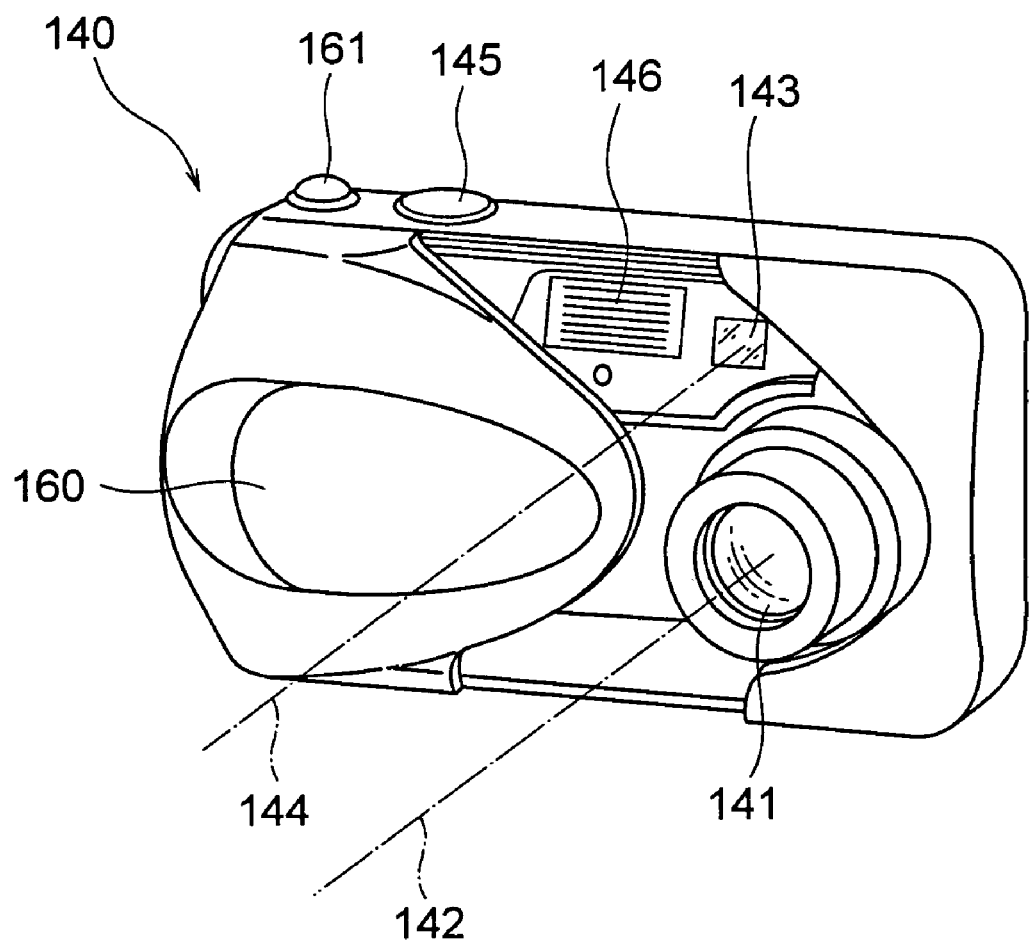
FIG. 14 is a front perspective view showing an appearance of a digital camera in which, a collapsible (lens barrel) zoom lens system is incorporated.
Figure 15:
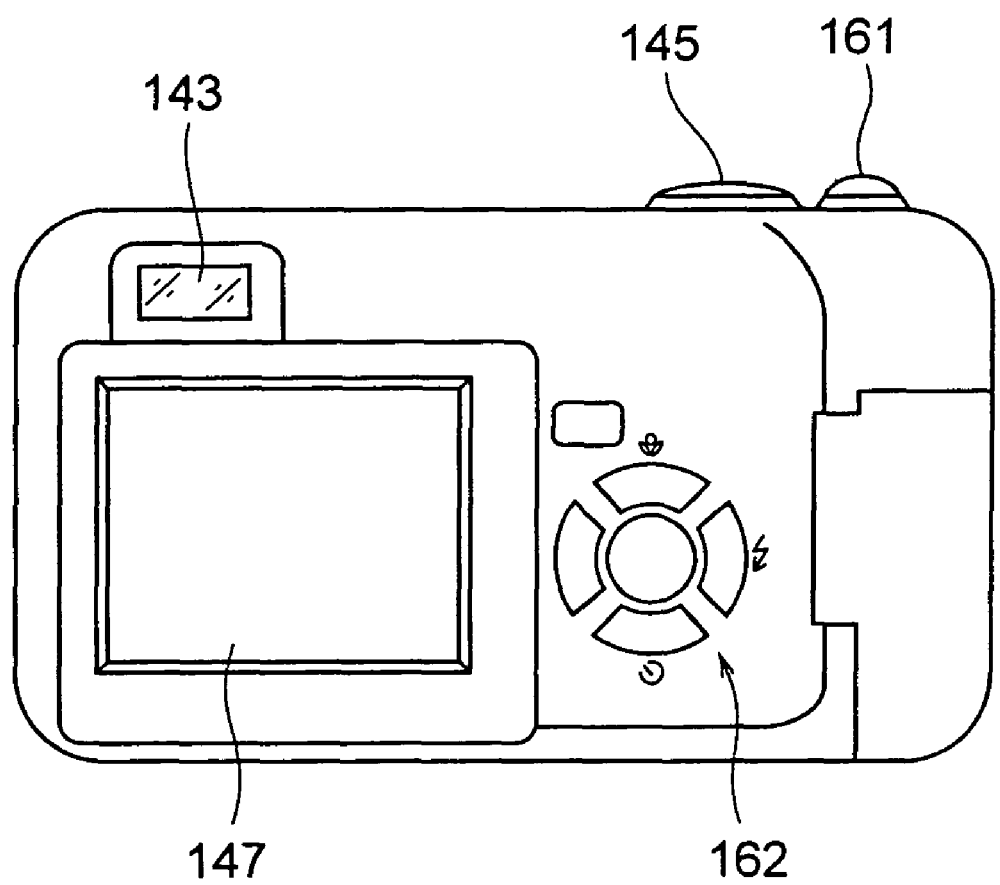
FIG. 15 is a rear perspective view of the digital camera.
Figure 16:
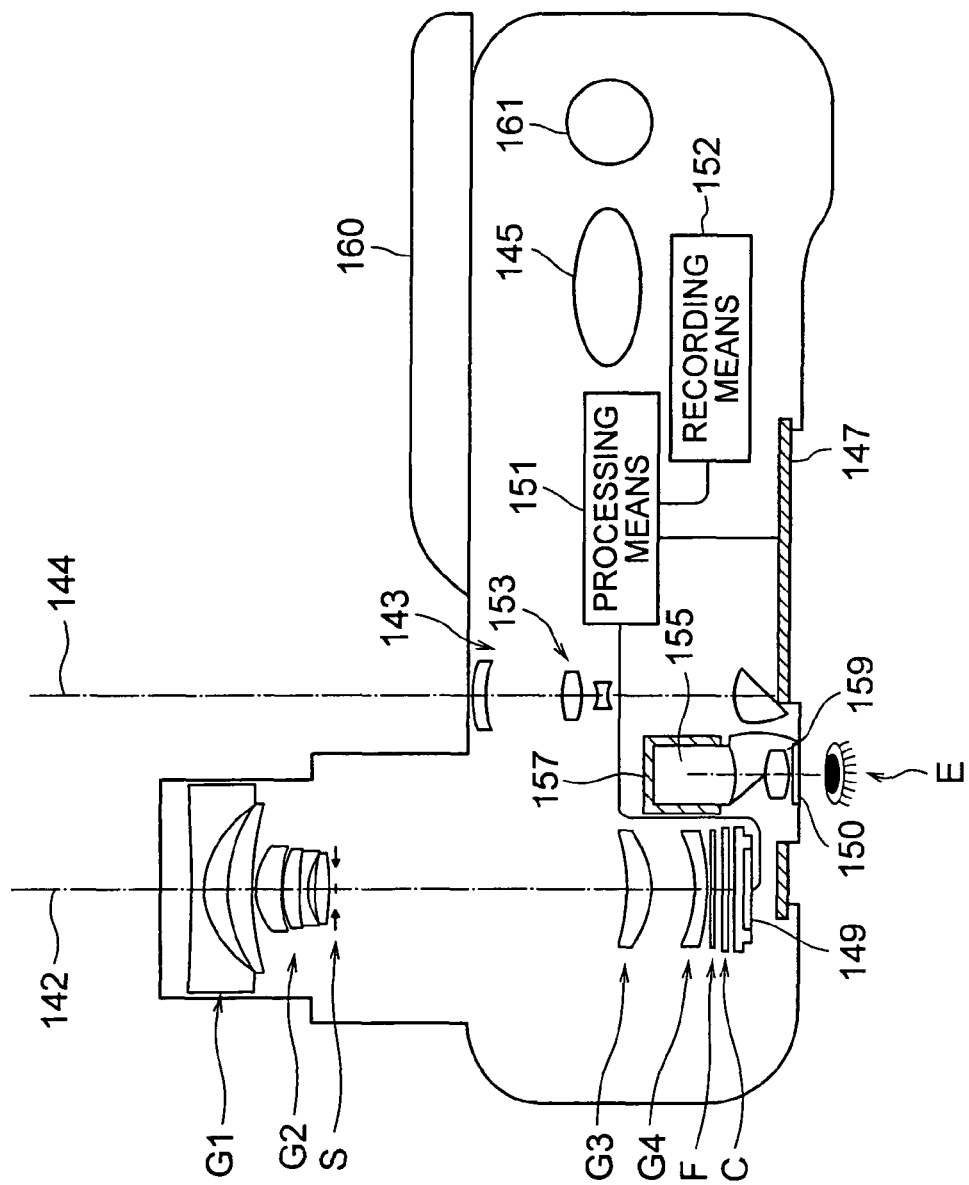
FIG. 16 is a cross-sectional view of the digital camera.

FIG. 14 to FIG. 16 are conceptual diagrams of a structure of a digital camera according to the present invention in which a zoom lens system described above is incorporated in a taking optical system 141. FIG. 14 is a front perspective view showing an appearance of a digital camera 140, FIG. 15 is a rear view of the same, and FIG. 16 is a schematic cross-sectional view showing a structure of the digital camera 140. In FIG. 14 and FIG. 16, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 14, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 17 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 17, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the zoom lens system according to the present invention is useful for small sizing and for securing the image angle at the wide angle end while securing the zooming ratio and brightness.

The zoom lens system and the image pickup apparatus according to the present invention show an effect that it is possible to provide a negative precedence zoom lens system which is advantageous for small sizing and for securing the image angle at the wide angle end, and for securing the zooming ratio and brightness.

What is claimed is:

1. A zoom lens system comprising, in order from an object side:
a first lens unit having a negative refracting power;
a second lens unit having a positive refracting power;
a third lens unit having a positive refracting power; and
a fourth lens unit having a negative refracting power, wherein at the time of zooming from a wide angle end to a telephoto end, the second lens unit moves such that a distance between the first lens unit and the second lens unit decreases, and distances between the other lens units change, and the first lens unit comprises in order from the object side, one negative lens component having an aspheric surface at least on one surface, and one positive lens component, and the total number of lens components in the first lens unit is two, and the fourth lens unit comprises one negative lens component having a surface on the object side as a concave surface, and the total number of lens components in the fourth lens unit is one, and the zoom lens system satisfies the following conditional expression (1A)

$$-4<(R_{4a}+R_{4b})/(R_{4a}-R_{4b})<-0.5 \tag{1A}$$

where, $R_{4a}$ denotes a paraxial radius of curvature of a surface on the object side, of the negative lens component in the fourth lens unit, and $R_{4b}$ denotes a paraxial radius of curvature of a surface on an image side, of the negative lens component in the fourth lens unit.

2. The zoom lens system according to claim 1, wherein the negative lens component in the first lens unit has a biconcave shape, and for the biconcave negative lens component, an absolute value of a paraxial radius of curvature of a surface on the image side is smaller than an absolute value of a paraxial radius of curvature on the object side, and a surface on the object side of the positive lens component in the first lens unit has a shape of a meniscus which is a convex surface.

3. The zoom lens system according to claim 1, wherein the negative lens component in the fourth lens unit has an aspheric surface.

4. The zoom lens system according to claim 1, wherein the negative lens component in the fourth lens unit is a single lens.

5. The zoom lens system according to claim 1, wherein the zoom lens system satisfies the following conditional expression (3A)

$$0<(R_{1a}+R_{1b})/(R_{1a}-R_{1b})<1 \tag{3A}$$

where, $R_{1a}$ denotes a paraxial radius of curvature of a surface on the object side, of the negative lens component in the first lens unit, and $R_{1b}$ denotes a paraxial radius of curvature of a surface on the image side, of the negative lens component in the first lens unit.

6. The zoom lens system according to claim 1, wherein the zoom lens system satisfies the following conditional expressions (4A) and (5A)

$$1.81<N_1<2.15 \tag{4A}$$

$$1.9<N_2<2.35 \tag{5A}$$

where, $N_1$ denotes a refractive index for a d-line of one of a negative lenses in the negative lens components in the first lens unit, and $N_2$ denotes a refractive index for a d-line of one of positive lenses in the positive lens components in the first lens unit.

7. The zoom lens system according to claim 1, wherein the third lens unit moves at the time of zooming from the wide angle end to the telephoto end, and focusing is carried out by moving the third lens unit in the optical axial direction.

8. The zoom lens system according to claim 1, wherein each of the negative lens component and the positive lens component in the first lens unit is one single lens made of glass.

9. The zoom lens system according to claim 1, comprising:
an aperture stop, which is disposed immediately after the image side of the second lens unit.

10. The zoom lens system according to claim 9, wherein a refracting surface nearest to an image side, of the first lens unit is a concave surface directed toward the image side, and a refracting surface nearest to the object side of the second lens unit is a convex surface directed toward the object side.

11. The zoom lens system according to claim 1, wherein the zoom lens system satisfies the following conditional expression (6A)

$$3.6 < f_t/f_w < 10 \qquad (6A)$$

where,
$f_w$ denotes a focal length of the entire zoom lens system, at the wide angle end, and
$f_t$ denotes a focal length of the entire zoom lens system, at the telephoto end.

12. A zoom lens system comprising, in order from an object side:
a first lens unit having a negative refracting power;
a second lens unit having positive refracting power;
a third lens unit having a positive refracting power; and
a fourth lens unit having a negative refracting power, wherein
zooming from a wide angle end to a telephoto end is carried out by changing distances between the lens units, and
the first lens unit comprises in order from the object side, one negative lens component having an aspheric surface at least on one surface, and one positive lens component, and
the total number of lens components in the first lens unit is two, and
the fourth lens unit comprises one negative lens component, and
the total number of lens components in the fourth lens unit is one, and
the zoom lens system satisfies the following conditional expressions (1A') and (2A)

$$-15 < (R_{4a} + R_{4b})/(R_{4a} - R_{4b}) < -0.5 \qquad (1A')$$

$$0.5 < D_T/f_t < 2 \qquad (2A)$$

where,
$R_{4a}$ denotes a paraxial radius of curvature of a surface on the object side, of the negative lens component in the fourth lens unit,
$R_{4b}$ denotes a paraxial radius of curvature of a surface on an image side, of the negative element in the fourth lens unit,
$D_T$ denotes an optical axial distance up to an image forming surface from a surface on the object side of the lens nearest to the object, in the zoom lens system at the telephoto end, and
$f_t$ denotes a focal length of the entire zoom lens system at the telephoto end.

13. The zoom lens system according to claim 12, comprising:
an aperture stop, which is disposed immediately after the image side of the second lens unit.

14. The zoom lens system according to claim 13, wherein a refracting surface nearest to the image side, of the first lens unit is a concave surface directed toward the image side, and a refracting surface nearest to the object side of the second lens unit is a convex surface directed toward the object side.

15. An image pickup apparatus comprising:
a zoom lens system according to claim 1; and
an image pickup element, which is disposed at an image side of the zoom lens system, and which converts an optical image formed by the zoom lens system into an electric signal.

16. The image pickup apparatus according to claim 15, comprising:
an image converting section which converts an electric signal including a distortion due to the zoom lens system, into an image signal in which, the distortion is corrected by image processing.

17. The image pickup apparatus according to claim 15, comprising:
an image converting section which converts an electric signal including a chromatic aberration of magnification due to the zoom lens system, into an image signal in which, the chromatic aberration of magnification is corrected by image processing.

18. A zoom lens system comprising, in order from an object side:
a first lens unit having a negative refracting power;
a second lens unit having a positive refracting power;
a third lens unit having a positive refracting power; and
a fourth lens unit having a negative refracting power, wherein
at the time of zooming from a wide angle end to a telephoto end, the second lens unit moves to the object side, and
a distance between the first lens unit and the second lens unit decreases, and a distance between the second lens unit and the third lens unit increases, and a distance between the third lens unit and the fourth lens unit changes, and
the first lens unit comprises one negative lens component having an aspheric surface at least on one surface, and one positive lens component, in order from the object side, and
the total number of lens components in the first lens unit is two, and
the total number of lens components in the third lens unit is one, and
the third lens unit comprises a positive meniscus lens component of which, a surface on the object side is a concave surface, and which satisfies the following conditional expression (AB), $$1.01 < (R_{3a} + R_{3b})/(R_{3a} - R_{3b}) < 30.0 \qquad (AB)$$

where,
$R_{3a}$ denotes a paraxial radius of curvature of a surface on the object side, of the positive meniscus lens component in the third lens unit, and
$R_{3b}$ denotes a paraxial radius of curvature of a surface on an image side, of the positive meniscus lens component in the third lens unit.

19. The zoom lens system according to claim 18, wherein the zoom lens system satisfies the following conditional expression (BB)

$$-0.60 < L_1/L_2 < -0.20 \qquad (BB)$$

where,
- $L_1$ denotes a focal length of the negative lens element in the first lens unit, and
- $L_2$ denotes a focal length of the positive lens element in the first lens unit.

20. The zoom lens system according to claim 18, wherein the second lens unit comprises at least one negative lens and two positive lenses.

21. The zoom lens system according to claim 20, wherein the second lens unit comprises at least three positive lenses and at least one of the positive lenses is cemented to the negative lens.

22. The zoom lens system according to claim 20, wherein the first lens unit and the second lens unit satisfy the following conditional expression (CB)

$$-1.7 < f_1/f_2 < -0.7 \tag{CB}$$

where,
- $f_1$ denotes a focal length of the first lens unit, and
- $f_2$ denotes a focal length of the second lens unit.

23. The zoom lens system according to claim 18, wherein the fourth lens unit comprises one negative lens component having a surface on the object side to be a concave surface, which satisfies the following conditional expression (1B)

$$-15 < (R_{4a}+R_{4b})/(R_{4a}-R_{4b}) < -0.5 \tag{1B}$$

where,
- $R_{4a}$ denotes a paraxial radius of curvature of a surface on the object side, of the negative lens component in the fourth lens unit, and
- $R_{4b}$ denotes a paraxial radius of curvature of a surface on the image side, of the, negative lens component in the fourth lens unit.

24. The zoom lens system according to claim 16, wherein the zoom lens system satisfies the following conditional expression (2B)

$$0.5 < D_T/f_t < 2 \tag{2B}$$

where,
- $D_T$ denotes an optical axial distance up to an image forming surface from a surface on the object side of the lens nearest to the object side, in the zoom lens system at the telephoto end, and
- $f_t$ denotes a focal length of the entire zoom lens system at the telephoto end.

25. The zoom lens system according to claim 18, wherein the negative lens component in the first lens unit has a biconcave shape, and for the biconcave negative lens component, an absolute value of a paraxial radius of curvature of a surface on the image side is smaller than an absolute value of a paraxial radius of curvature on the object side, and a surface on the object side of the positive lens component in the first lens unit has a shape of a meniscus which is a convex surface.

26. The zoom lens system according to claim 18, wherein the negative lens component in the fourth lens unit has an aspheric surface.

27. The zoom lens system according to claim 18, wherein the negative lens component in the fourth lens unit is a single lens.

28. The zoom lens system according to claim 18, wherein the zoom lens system satisfies the following conditional expression (3B)

$$0 < (R_{1a}+R_{1b})/(R_{1a}-R_{1b}) < 1 \tag{3B}$$

where,
- $R_{1a}$ denotes a paraxial radius of curvature of a surface on the object side, of the negative lens component in the first lens unit, and
- $R_{1b}$ denotes a paraxial radius of curvature of a surface on the image side, of the negative lens component in the first lens unit.

29. The zoom lens system according to claim 18, wherein the zoom lens system satisfies the following conditional expressions (4B) and (5B)

$$1.81 < N_1 < 2.15 \tag{4B}$$

$$1.9 < N_2 < 2.35 \tag{5B}$$

where,
- $N_1$ denotes a refractive index for a d-line of one of a negative lenses in the negative lens components in the first lens unit, and
- $N_2$ denotes a refractive index for a d-line of one of positive lenses in the positive lens components in the first lens unit.

30. The zoom lens system according to claim 18, wherein the third lens unit moves at the time of zooming from the wide angle end to the telephoto end, and focusing is carried out by moving the third lens unit in the optical axial direction.

31. The zoom lens system according to claim 18, wherein each of the negative lens component and the positive lens component in the first lens unit is one single lens made of glass.

32. The zoom lens system according to claim 18, wherein the zoom lens system satisfies the following conditional expression (6B)

$$3.6 < f_t/f_w < 10 \tag{6B}$$

where,
- $f_w$ denotes a focal length of the entire zoom lens system, at the wide angle end, and
- $f_t$ denotes a focal length of the entire zoom lens system, at the telephoto end.

33. An image pickup apparatus comprising:
a zoom lens system according to; claim 18 and
an image pickup element, which is disposed at an image side of the zoom lens system, and which converts an optical image formed by the zoom lens system, into an electric signal.

34. The image pickup apparatus according to claim 33, comprising:
an image converting section which converts an electric signal including a distortion due to the zoom lens system, into an image signal in which, the distortion is corrected by image processing.

35. The image pickup apparatus according to claim 33, comprising:
an image converting section which converts an electric image including a chromatic aberration of magnification due to the zoom lens system into an image signal in which, the chromatic aberration of magnification is corrected by image processing.

\* \* \* \* \*